US009112989B2

(12) United States Patent
Lee et al.

(10) Patent No.: US 9,112,989 B2
(45) Date of Patent: Aug. 18, 2015

(54) SYSTEM AND METHOD OF SMART AUDIO LOGGING FOR MOBILE DEVICES

(75) Inventors: Te-Won Lee, San Diego, CA (US); Khaled Helmi El-Maleh, San Marcos, CA (US); Heejong Yoo, San Diego, CA (US); Jongwon Shin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1087 days.

(21) Appl. No.: 13/076,242

(22) Filed: Mar. 30, 2011

(65) Prior Publication Data

US 2012/0078397 A1 Mar. 29, 2012

Related U.S. Application Data

(60) Provisional application No. 61/322,176, filed on Apr. 8, 2010.

(51) Int. Cl.
*G06F 17/00* (2006.01)
*H04M 1/725* (2006.01)
*G10L 17/00* (2013.01)
*G10L 25/78* (2013.01)
*G10L 15/08* (2006.01)
*H04M 1/60* (2006.01)
*H04M 1/656* (2006.01)

(52) U.S. Cl.
CPC .......... H04M 1/7255 (2013.01); G10L 17/00 (2013.01); *G10L 25/78* (2013.01); *G10L 2015/088* (2013.01); *H04M 1/6008* (2013.01); *H04M 1/656* (2013.01)

(58) Field of Classification Search
CPC . H04M 1/656; H04M 1/6008; H04M 1/7255; G10L 25/78; G10L 17/00; G10L 2015/088
USPC .......................................................... 700/94
See application file for complete search history.

(56) References Cited

U.S. PATENT DOCUMENTS

| 4,704,696 | A | * | 11/1987 | Reimer et al. ................. 704/275 |
| 4,780,906 | A | * | 10/1988 | Rajasekaran et al. ......... 704/251 |
| 5,614,914 | A | * | 3/1997 | Bolgiano et al. .............. 342/364 |
| 5,749,072 | A | * | 5/1998 | Mazurkiewicz et al. ..... 704/275 |
| 7,224,981 | B2 | | 5/2007 | Deisher et al. |
| 7,392,183 | B2 | | 6/2008 | Deisher |
| 7,797,331 | B2 | * | 9/2010 | Theimer et al. ............... 707/769 |
| 8,296,383 | B2 | * | 10/2012 | Lindahl ......................... 709/206 |

(Continued)

FOREIGN PATENT DOCUMENTS

| CN | 101404680 A | 4/2009 |
| CN | 101478717 A | 7/2009 |

(Continued)

OTHER PUBLICATIONS

Gellerson_artefacts copyright 2002.*

(Continued)

*Primary Examiner* — Paul McCord
(74) *Attorney, Agent, or Firm* — Espartaco Diaz Hidalgo

(57) ABSTRACT

A mobile device that is capable of automatically starting and ending the recording of an audio signal captured by at least one microphone is presented. The mobile device is capable of adjusting a number of parameters related with audio logging based on the context information of the audio input signal.

111 Claims, 28 Drawing Sheets

(56) References Cited

U.S. PATENT DOCUMENTS

| | | | |
|---|---|---|---|
| 2006/0020486 A1* | 1/2006 | Kurzweil et al. | 705/1 |
| 2006/0053011 A1* | 3/2006 | Kim | 704/236 |
| 2006/0149547 A1 | 7/2006 | Miyazaki | |
| 2007/0033030 A1 | 2/2007 | Gottesman | |
| 2007/0133826 A1* | 6/2007 | Burk et al. | 381/122 |
| 2007/0294716 A1* | 12/2007 | Jeong et al. | 725/19 |
| 2008/0192906 A1* | 8/2008 | Luh et al. | 379/88.28 |
| 2008/0201142 A1 | 8/2008 | Charlier et al. | |
| 2009/0089056 A1* | 4/2009 | Fujii | 704/246 |
| 2009/0119246 A1 | 5/2009 | Kansal | |
| 2009/0177476 A1 | 7/2009 | Darrell et al. | |
| 2009/0190769 A1 | 7/2009 | Wang et al. | |
| 2009/0228269 A1* | 9/2009 | Monne et al. | 704/231 |
| 2010/0029294 A1 | 2/2010 | Matsuoka | |
| 2010/0081487 A1 | 4/2010 | Chen et al. | |
| 2010/0121636 A1* | 5/2010 | Burke et al. | 704/233 |
| 2010/0198375 A1* | 8/2010 | Rottler et al. | 700/94 |
| 2013/0190037 A1* | 7/2013 | Hellwig et al. | 455/550.1 |
| 2013/0226850 A1* | 8/2013 | Hannuksela et al. | 706/14 |

FOREIGN PATENT DOCUMENTS

| | | |
|---|---|---|
| CN | 201278556 Y | 7/2009 |
| CN | 101594410 A | 12/2009 |
| JP | 63260345 | 10/1988 |
| JP | H08185671 A | 7/1996 |
| JP | H09284385 A | 10/1997 |
| JP | H10161698 A | 6/1998 |
| JP | 11-187156 A | 7/1999 |
| JP | H11187156 A | 7/1999 |
| JP | 2001022386 A | 1/2001 |
| JP | 2001156910 A | 6/2001 |
| JP | 2003198716 A | 7/2003 |
| JP | 2005221565 A | 8/2005 |
| JP | 2006107044 A | 4/2006 |
| JP | 2007140063 A | 6/2007 |
| JP | 2008107044 A | 5/2008 |
| JP | 2008165097 A | 7/2008 |
| WO | WO2004057892 A1 | 7/2004 |
| WO | 2010030889 A1 | 3/2010 |

OTHER PUBLICATIONS

International Search Report and Written Opinion—PCT/US2011/031859, International Search Authority—European Patent Office—Sep. 28, 2011.

Hong Lu et al., "SoundSense: Scalable Sound Sensing for People-Centric Applications on Mobile Phones", MobiSys'09, Jun. 22-25, 2009, Kraków, Poland, pp. 165-178.

* cited by examiner

| Context Info S600 |||||||
|---|---|---|---|---|---|---|
| Environments Awareness | Activity Awareness | ... | Audio Class (Noise/Music /Speech) | Speakers Identification | Keywords Identification | Emotion Awareness |
| ↘610 | ↘620 | | ↘630 | ↘640 | ↘650 | ↘660 |

SYSTEM AND METHOD OF SMART AUDIO LOGGING FOR MOBILE DEVICES

RELATED APPLICATIONS

A claim of priority is made to U.S. Provisional Application No. 61/322,176 entitled "SMART AUDIO LOGGING" filed Apr. 8, 2010, and assigned to the assignee hereof and hereby expressly incorporated by reference herein.

BACKGROUND

I. Field

The present disclosure generally relates to audio and speech signal capturing. More specifically, the disclosure relates to mobile devices capable of initiating and/or terminating audio and speech signal capturing operations, or interchangeably logging operation, based on the analysis of audio context information.

II. Description of Related Art

Thanks to the power control technology advance in Application Specific Integrated Circuits (ASIC) and increased computational power of mobile processors such as Digital Signal Processor (DSP) or microprocessors, an increasing number of mobile devices are now capable of enabling much more complex features which were not regarded as feasible until recently due to the lack of required computational power or hardware (HW) support. For example, mobile stations (MS) or mobile phones were initially developed to enable voice or speech communication over traditional circuit-based wireless cellular networks. Thus, MS was originally designed to address fundamental voice applications like voice compression, acoustic echo cancellation (AEC), noise suppression (NS), and voice recording.

The process of implementing a voice compression algorithm is known as vocoding and the implementing apparatus is known as a vocoder or "speech coder." Several standardized vocoding algorithms exist in support of the different digital communication systems which require speech communication. The $3^{rd}$ Generation Partnership Project 2 (3GPP2) is an example standardization organization which specifies Code Division Multiple Access (CDMA) technology such as IS-95, CDMA2000 1x Radio Transmission Technology (1xRTT), and CDMA2000 Evolution-Data Optimized (EV-DO) communication systems. The $3^{rd}$ Generation Partnership Project (3GPP) is another example standardization organization which specifies the Global System for Mobile Communications (GSM), Universal Mobile Telecommunications System (UMTS), High-Speed Downlink Packet Access (HSDPA), High-Speed Uplink Packet Access (HSUPA), High-Speed Packet Access Evolution (HSPA+), and Long Term Evolution (LTE). The Voice over Internet Protocol (VOIP) is an example protocol used in the communication systems defined in 3GPP and 3GPP2, as well as others. Examples of vocoders employed in such communication systems and protocols include International Telecommunications Union (ITU)-T G.729, Adaptive Multi-Rate (AMR) codec, and Enhanced Variable Rate Codec (EVRC) speech service options 3, 68, and 70.

Voice recording is an application to record human voice. Voice recording is often referred to as voice logging or voice memory interchangeably. Voice recording allows users to save some portion of a speech signal picked up by one or more microphones into a memory space. The saved voice recording can be played later in the same device or it can be transmitted to a different device through a voice communication system. Although voice recorders can record some music signals, the quality of recorded music is typically not superb because the voice recorder is optimized for speech characteristics uttered by a human vocal tract.

Audio recording or audio logging is sometimes used interchangeably with voice recording but it is sometimes understood as a different application to record any audible sound including human voice, instruments and music because of its ability to capture higher frequency signals than that generated by the human vocal tract. In the context of the present application, "audio logging" or "audio recording" terminology will be broadly used to refer to voice recording or audio recording.

Audio logging enables recording of all or some portions of an audio signal of interest which are typically picked up by one or more microphones in one or more mobile devices. Audio logging is sometimes referred to as audio recording or audio memo interchangeably.

SUMMARY

This document describes a method of processing a digital audio signal for a mobile device. This method includes receiving acoustic signal by at least one microphone; converting the received acoustic signal into the digital audio signal; extracting at least one auditory context information from the digital audio signal; in response to automatically detecting a start event indicator, performing an audio logging for the digital audio signal; and in response to automatically detecting an end event indicator, ending the audio logging. This at least one auditory context information may be related to audio classification, keyword identification, or speaker identification. This at least one auditory context information may be based at least in part on signal energy, signal-to-noise ratio, spectral tilt, or zero-crossing rate. This at least one auditory context information may be based at least in part on non-auditory information such as scheduling information or calendaring information. This document also describes an apparatus, a combination of means, and a computer-readable medium relating to this method.

This document also describes a method of processing a digital audio signal for a mobile device. This method includes receiving acoustic signal by at least one microphone; transforming the received acoustic signal into an electrical signal; sampling the electrical signal based on a sampling frequency and a data width for each sampled data to obtain the digital audio signal; storing the digital audio signal into a buffer; extracting at least one auditory context information from the digital audio signal; in response to automatically detecting a start event indicator, performing an audio logging for the digital audio signal; and in response to automatically detecting an end event indicator, ending the audio logging. This detecting the start or end event indicators may be based at least in part on non-auditory information such as scheduling information or calendaring information. This document also describes an apparatus, a combination of means, and a computer-readable medium relating to this method.

This document also describes a method of detecting a start event indicator. This method includes selecting at least one context information from the at least one auditory context information; comparing the selected context information with at least one pre-determined thresholds; and determining if the start event indicator has been detected based on the comparing the selected context information with at least one pre-determined thresholds. This document also describes an apparatus, a combination of means, and a computer-readable medium relating to this method.

This document also describes a method of detecting an end event indicator. This method includes selecting at least one context information from the at least one auditory context information; comparing the selected context information with at least one pre-determined thresholds; and determining if the end event indicator has been detected based on the comparing the selected context information with at least one pre-determined thresholds. This detecting an end event indicator may be based at least in part on non-occurrence of auditory event during pre-determined period of time. This document also describes an apparatus, a combination of means, and a computer-readable medium relating to this method.

This document also describes a method of performing the audio logging. This method includes updating at least one parameter related with the converting based at least in part on the at least one auditory context information; in response to determining if an additional processing is required based at least in part on the at least one auditory context information, applying the additional processing to the digital audio signal to obtain processed audio signal; and storing the processed audio signal into a memory storage. The additional processing may be signal enhancement processing such as acoustic echo cancellation (AEC), receiving voice enhancement (RVE), active noise cancellation (ANC), noise suppression (NS), acoustic gain control (AGC), acoustic volume control (AVC), or acoustic dynamic range control (ADRC). The noise suppression may be based on single-microphone or multiple-microphones based solution. The additional processing may be signal compression processing such as speech compression or audio compression. The compression parameters such as compression mode, bitrate, or channel number may be determined based on the auditory context information. The memory storage includes a local memory inside the mobile device or a remote memory connected to the mobile device through a wireless channel. The selection between the local memory and the remote memory may be based at least in part on the auditory context information. This document also describes an apparatus, a combination of means, and a computer-readable medium relating to this method.

This document also describes a method for a mobile device which includes automatically detecting a start event indicator; processing first portion of audio input signal to obtain first information in response to the detecting of a start event indicator; determining at least one recording parameter based on the first information; and reconfiguring an audio capturing unit of the mobile device based on the determined at least one recording parameter. This reconfiguring may occurs during an inactive portion of the audio input signal. This at least one recording parameter includes information indicative of a sampling frequency or a data width for an A/D converter of the mobile device. This at least one recording parameter includes information indicative of the number of active microphone of the mobile device or timing information indicative of at least one microphone's wake up interval or active duration. This first information may be context information describing an environment in which the mobile device is recording or a characteristic of the audio input signal. This start event indicator may be based on a signal transmitted over a wireless channel. This document also describes an apparatus, a combination of means, and a computer-readable medium relating to this method.

This document also describes a method for a mobile device which includes automatically detecting a start event indicator; processing first portion of audio input signal to obtain first information in response to the detecting of a start event indicator; determining at least one recording parameter based on the first information; reconfiguring an audio capturing unit of the mobile device based on the determined at least one recording parameter; processing second portion of the audio input signal to obtain second information; enhancing the audio input signal by suppressing a background noise to obtain an enhanced signal; encoding the enhanced signal to obtain an encoded signal; and storing the encoded signal at a local storage within the mobile device. This encoding the enhanced signal includes determining an encoding type based on the second information; determining at least one encoding parameter for the determined encoding; and processing the enhanced signal based on the determined encoding type and the determined at least one encoding parameter to obtain the encoded signal. This herein the at least one encoding parameter includes bitrate or encoding mode. In addition, this method may include determining a degree of the enhancing the audio input signal based on the second information. This document also describes an apparatus, a combination of means, and a computer-readable medium relating to this method.

This document also describes a method for a mobile device which includes automatically detecting a start event indicator; processing first portion of audio input signal to obtain first information in response to the detecting of a start event indicator; determining at least one recording parameter based on the first information; reconfiguring an audio capturing unit of the mobile device based on the determined at least one recording parameter; processing second portion of the audio input signal to obtain second information; enhancing the audio input signal by suppressing a background noise to obtain an enhanced signal; encoding the enhanced signal to obtain an encoded signal; and storing the encoded signal at a local storage within the mobile device. In addition, this method may include automatically detecting an end event indicator; and in response to the detecting an end event indicator, determining a long-term storage location for the encoded signal between the local storage within the mobile device and a network storage connected to the mobile device through a wireless channel. This determining the long-term storage location may be based on a priority of the encoded signal. This document also describes an apparatus, a combination of means, and a computer-readable medium relating to this method.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present application will be better understood by reference to the accompanying drawings.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, and/or selecting from a set of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B").

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). Unless indicated otherwise, the term "context" (or "audio context") is used to indicate a component of an audio or speech and conveys information from the ambient environment of the speaker, and the term "noise" is used to indicate any other artifact in the audio or speech signal.

Figure 1A:
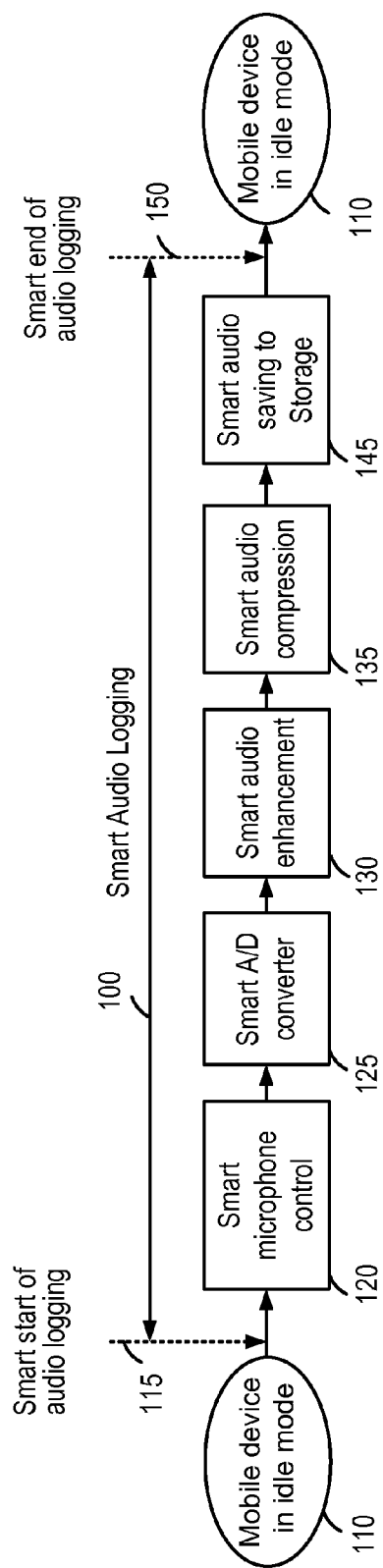
FIG. 1A is a diagram illustrating the concept of a smart audio logging system.

FIG. 1A is a diagram illustrating the concept of smart audio logging system. One or more microphones in mobile device may be configured to receive acoustic signal continuously or periodically while the mobile device in idle mode. The received acoustic signal may be converted to digital audio signal by an Analog to Digital (A/D) converter. This conversion may include transforming the received acoustic signal into an electrical signal in analog or continuous form in general, sampling or quantizing the electrical signal to generate digital audio signal. The number and the size of the digital audio signal may depend on a sampling frequency and a data width for each digital audio sample. This digital audio signal may be configured to be temporarily stored in a memory or a buffer. This digital audio signal may be processed to extract meaningful information. This information is generally referred to as "context information S600" or interchangeably "auditory context information." The context information may include information about an environment in which the mobile device is recording and a characteristic of the audio input signal received by at least one microphone. Detailed description of the context information S600 will be presented in the subsequent disclosure.

The smart audio logging system may be configured to perform smart start 115 or smart end 150 of audio logging. In comparison to a conventional audio logging system in which a user manually initiates or ends recording of the audio signal, the smart audio logging system may be configured to start or end audio logging by automatically detecting a start event indicator or an end event indicator. These indicators may be based on the context information derived from the audio signal; databases located within the mobile device or connected to the mobile device through wired or wireless network connections; non-acoustic sensors; or even a signaling from other smart audio logging devices. Alternatively, these indicators may be configured to include a user's voice command or key command as well. In one embodiment, the end event indicator may be configured to be based on non-occurrence of auditory event during pre-determined period of time. The detection of the start event indicator and the end event indicator may include the steps of selecting at least one particular context information out of at least one auditory context information; comparing the selected context information with at least one pre-determined thresholds, and determining if the start or end event indicators have been detected based on the comparison.

The smart audio logging system may be configured to comprise a number of smart sub-blocks, or interchangeably, smart building blocks based at least in part on the at least one auditory context information. The smart building block may be characterized by its ability to dynamically configure its own operational mode or functional parameters during the audio logging process in contrast to conventional audio logging in which configuration or operational mode may be pre-determined or statically determined during the operation.

For instance, in one embodiment of smart audio logging, the smart microphone control block 120 of FIG. 1A may be configured to dynamically adjust the number of active microphones or ON/OFF timing control of at least one microphones during audio logging process based on the context information S600. In another embodiment, the smart A/D converter block 125 of FIG. 1A may be configured to dynamically adjust its own operational parameters based on the context information S600. Such parameters may include sampling frequency of audio signal captured from at least one microphone or data width of the captured digital audio sample based on the context information S600. These parameters may be referred to as "recording parameter" because the selection of these parameters would impact on the quality or the size of recorded audio logging. These parameters may be configured to be reconfigured, or switched, during an inactive portion of the audio input signal to minimize the impact on the audio quality. The inactive portion of the audio input signal may still include some level of minimum audio activity. But in general "inactive portion" means no active as well as relatively less active portion of the audio input signal.

In another embodiment, the smart audio enhancement block 130 of FIG. 1A may be configured to dynamically select based on the context information S600 if audio signal enhancement is necessary and in such a case what type of signal enhancement should be performed. The smart audio enhancement block 130 may be configured to select the degree of signal enhancement level, for example aggressive enhancement or less aggressive enhancement, based the context information S600. The signal enhancement may be configured to be based on single-microphone or multiple-microphones. The smart audio compression block 135 of FIG. 1A may be configured to dynamically select the type of coding format to be used or coding parameters thereof, such as compression mode, bitrate, or audio/speech channel number, based on the context information S600. More detailed description and examples of dynamic configuration feature of the smart sub-blocks will be presented subsequently. The smart audio saving to storage block 145 of FIG. 1A may be configured to select the location in which the captured audio logging would be stored based on the context information S600. The selection may be between a local memory of the mobile device and a remote memory connected to the mobile device through a wired or wireless channel. The smart audio saving to storage block 145 may be configured to store the digital audio signal in the local memory by default during the process of audio logging and then subsequently determine a long-term storage location between the local storage and a network storage.

It should be noted that the smart building blocks 120, 125, 130, 135, 145 and the order thereof disclosed in FIG. 1A are only for exemplary purpose and therefore it should be obvious for one skilled in the art that some of the building blocks may be reordered, combined or even omitted in whole or in part within the scope of the application. For example, in one embodiment according to the present application, the smart audio enhancement block 130 may be omitted or replaced with traditional audio enhancement block in which the ability to dynamically reconfigure its own operational mode according to the context information S600 is not available. Likewise, the smart audio compression block 135 may be omitted or replaced by conventional audio compression.

Figure 1B:
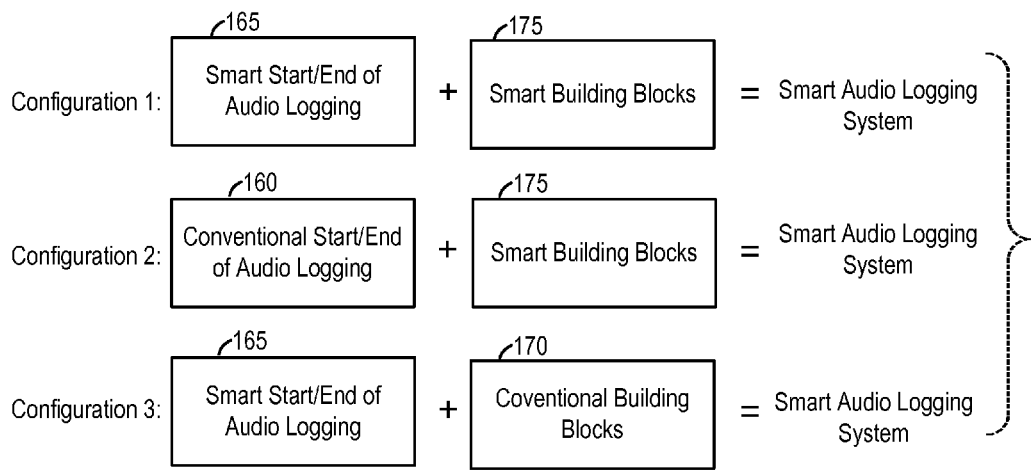
FIG. 1B is another diagram illustrating the concept of a smart audio logging system.
Figure 1C:
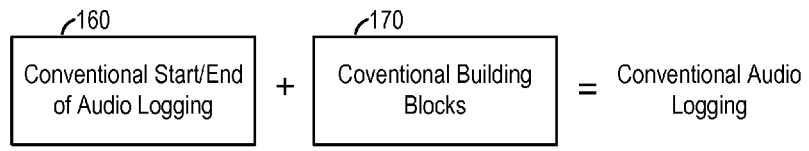
FIG. 1C is a diagram illustrating the concept of a conventional audio logging system.

The smart audio logging system may also refer to the system that may be configured to use the combination of some of existing conventional audio logging system and some of either smart building blocks or smart start/end of logging feature as it was presented in FIG. 1B. In contrast, FIG. 1C is a diagram illustrating the concept of conventional audio logging system in which neither the smart start/end of audio logging feature nor any of the smart building blocks are included.

FIG. 1B shows three different exemplary conceptual configurations of smart audio logging system. Configuration 1 presents the system in which both the smart start/end audio logging feature 165 and the smart building blocks 175 are implemented. The system in configuration 1 is therefore regarded as the most advanced smart audio logging system. Configuration 2 shows the system that may be configured to replace the smart start/end of audio logging 165 feature of configuration 1 with a conventional start/end of audio logging feature 160. In an alternative implementation, configuration 3 shows the system that may be configured to replace the smart building blocks 175 of configuration 1 with conventional building blocks 170.

Figure 2:
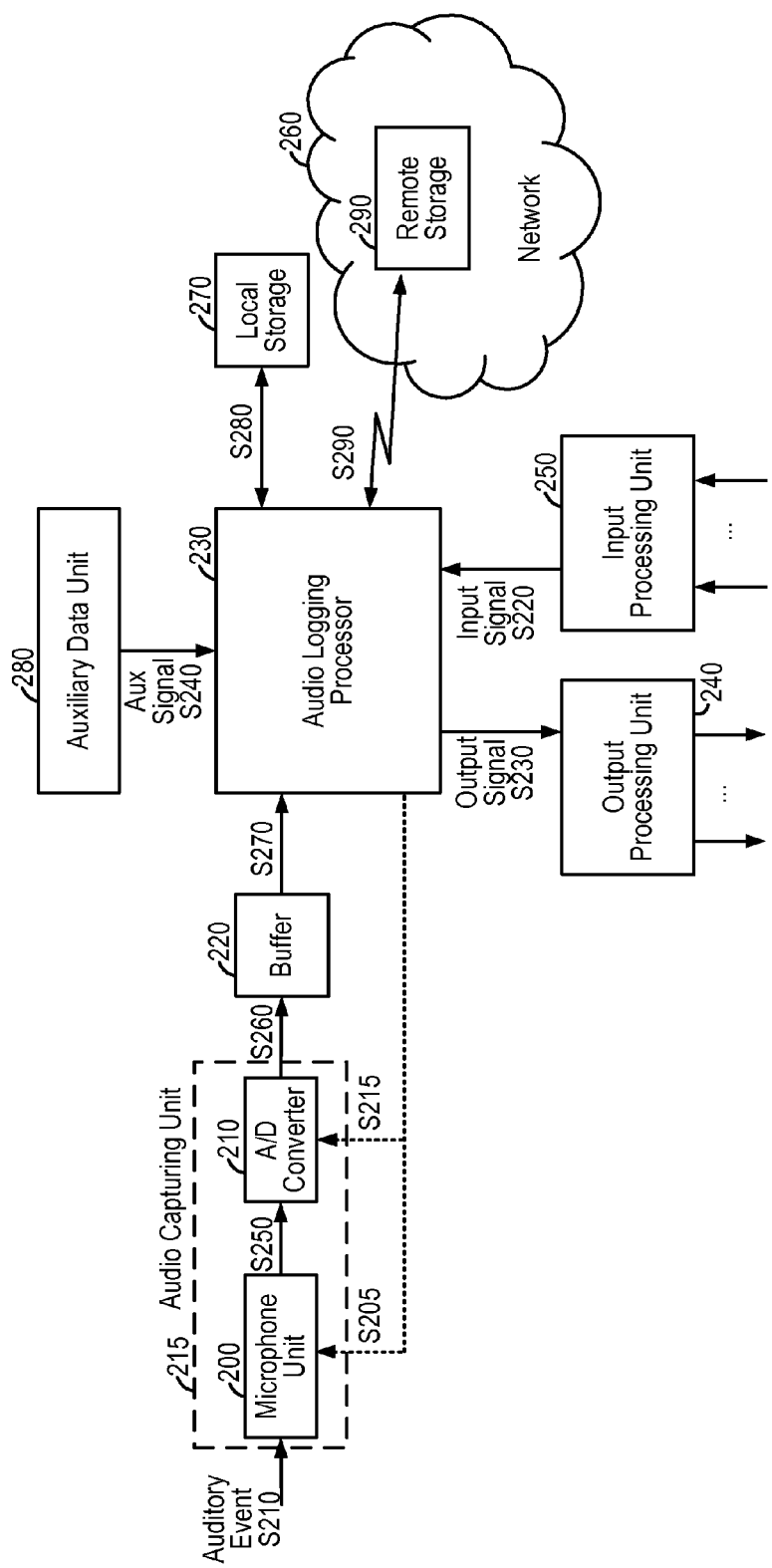
FIG. 2 is a diagram of an exemplary embodiment of the smart audio logging system.

FIG. 2 is an exemplary embodiment of the smart audio logging system. Audio Capturing Unit 215 comprising Microphone Unit 200 and A/D Converter 210 is the front-end of the smart audio logging system. The Microphone Unit 200 comprises at least one microphone which may be configured to pick up or receive an acoustic audio signal and transform it into an electrical signal. The A/D Converter 210 converts the audio signal into a discrete digital signal. In another embodiment, the at least one microphone inside the Microphone Unit 200 may be a digital microphone. In such case, A/D conversion step may be configured to be omitted.

Auditory Event S210 refers generally to audio signal or particularly to the audio signal of interest to a user. For instance, the Auditory Event S210 may include, but not limited to, the presence of speech signal, music, specific background noise characteristics, or specific keywords. The Auditory Event S210 is often referred to as "auditory scene" in the art.

The Audio Capturing Unit 215 may include at least one microphone or at least one A/D converter. At least one microphone or at least one A/D converter might have been part of a conventional audio logging system and may be powered up only during the active usage of mobile device. For example, a traditional audio capturing unit in the conventional system may be configured to be powered up only during the entire voice call or entire video recording in response to the user's selection of placing or receiving the call, or pressing the video recording start button.

In the present application, however, the Audio Capturing Unit 215 may be configured to intermittently wake up, or power up, even during idle mode of the mobile device in addition to during a voice call or during the execution of any other applications that might require active usage of at least one microphone. The Audio Capturing Unit 215 may even be configured to stay powered up, continuously picking up an audio signal. This approach may be referred to as "Always On." The picked-up audio signal S260 may be configured to be stored in Buffer 220 in a discrete form.

The "idle mode" of the mobile device described herein generally refers to the status in which the mobile device is not actively running any application in response to user's manual input unless specified otherwise. For example, typical mobile devices send or receive signals periodically to and from one or more base stations even without the user's selection. The status of mobile device performing this type of activity is regarded as idle mode within the scope of the present application. When the user is actively engaging in voice communication or video recording using his or her mobile device, it is not regarded as idle mode.

The Buffer 220 stores digital audio data temporarily before the digital audio data is processed by the Audio Logging Processor 230. The Buffer 220 may be any physical memory and, although it is preferable to be located within the mobile device due to faster access advantages and relatively small required memory footprint from the Audio Capturing Unit 215, the Buffer 220 also could be located outside of mobile devices via wireless or wired network connections. In another embodiment, the picked-up audio signal S260 may be configured to be directly connected to the Audio Logging Processor 230 without temporarily being stored in the Buffer 220. In such a case, the picked-up audio signal S260 may be identical to the Audio Input S270.

The Audio Logging Processor 230 is a main processing unit for the smart audio logging system. It may be configured to make various decisions with respect to when to start or end logging or how to configure the smart building blocks. It may be further configured to control adjacent blocks, to interface with Input Processing Unit 250 or Output Processing Unit 240, to determine the internal state of smart audio logging system, and to access to Auxiliary Data Unit 280 or databases. One example of an embodiment of the Audio Logging Processor 230 is presented in FIG. 5. The Audio Logging Processor 230 may be configured to read the discrete audio input data stored in the Buffer. The audio input data then may be processed for extraction of context information S600 which then may be stored in memory located either inside or outside of the Audio Logging Processor 230. More detailed description of context information S600 is presented in conjunction with the description of FIG. 6 and FIG. 7.

The Auxiliary Data Unit 280 may include various databases or application programs and it may be configured to provide additional information which may be used in part or in whole by the Audio Logging Processor 230. In one embodiment, the Auxiliary Data Unit 280 may include scheduling information of the owner of the mobile device equipped with the smart audio logging feature. In such case, the scheduling information may, for example, include following details: "the time and/or duration of next business meeting," "invited attendees," "location of meeting place," or "subject of the meeting" to name a few. In one embodiment, the scheduling information may be obtained from calendaring application such as Microsoft Outlook or any other commercially available Calendar applications. Upon receiving or actively retrieving these types of details from the Auxiliary Data Unit 280, the Audio Logging Processor 230 may be configured to make decisions regarding when to start or stop audio logging according to the details preferably in combination with the context information S600 extracted from the discrete audio input data stored in the Buffer 220.

Storage generally refers to one or more memory locations in the system which is designed to store the processed audio logging from the Audio Logging Processor 230. The Storage may be configured to comprise Local Storage 270 which is locally available inside mobile devices or Remote Storage 290 which is remotely connected to mobile devices via wired or wireless communication channel. The Audio Logging Processor 230 may be configured to select where to store the processed audio loggings between the Local Storage 270 and the Remote Storage 290. The storage selection may be made according to various factors which may include but not limited to the context information S600, the estimated size of audio loggings, available memory size, network speed, the latency of the network, or the priority of the context information S600. The storage selection may even be configured to be switched between the Local Storage 270 and the Remote Storage 290 dynamically during active audio logging process if necessary.

Figure 3:
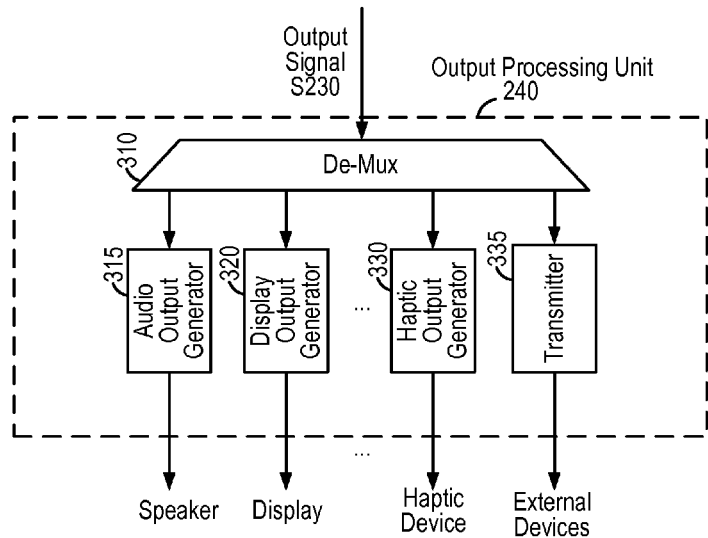
FIG. 3 is a diagram of an embodiment of the Output Processing Unit 240.

FIG. 3 is an example diagram of an embodiment of Output Processing Unit 240. The Output Processing Unit 240 may be configured to deliver the Output Signal S230 generated from the Audio Logging Processor 230 to various peripheral devices such as speaker, display, Haptic device, or external smart audio logging devices. Haptic device allows the system to provide advanced user experience based on tactile feedback mechanism. It may take advantage of a user's sense of touch by applying forces, vibration, and/or motions to the user. The smart audio logging system may transmit the Output Signal S230 through the Output Processing Unit 240 to another at least one smart audio logging systems. The transmission of the output signal may be over wireless channel and various wireless communication protocols preferably such as GSM, UMTS, HSPA+, CDMA, Wi-Fi, LTE, VOIP, or WiMax may be used. The Output Processing Unit 240 may be configured to include De-multiplexer (De-Mux) 310 which may distribute the Output Signal S230 selectively to appropriate peripheral devices. Audio Output Generator 315, if selected by De-Mux 310, generates audio signal for speaker or headset according to the Output Signal S230. Display Output Generator 320, if selected by De-Mux 310, generates video signal for display device according to the Output Signal S230. Haptic Output Generator 330, if selected by De-Mux 310, generates tactile signal for Haptic device. Transmitter, if selected by De-Mux 310, generates the processed signal that is ready for transmission to the external devices including other smart audio logging system.

Figure 4:
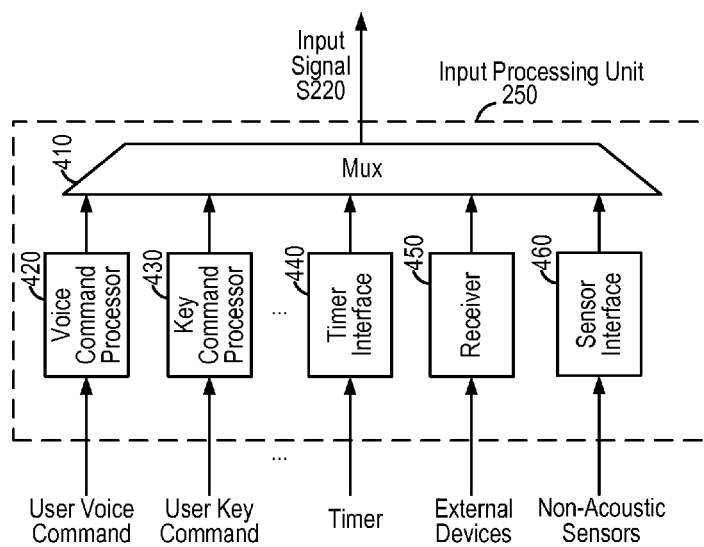
FIG. 4 is a diagram of an embodiment of the Input Processing Unit 250.

FIG. 4 is an example diagram of an embodiment of Input Processing Unit 250. In this example, the Input Processing Unit 250 processes various types of inputs and generates the Input Signal S220 which may be selectively transferred through Multiplexer (Mux) 410 to the Audio Logging Processor 230. The inputs may include, but not limited to, user's voice or key commands, the signal from non-acoustic sensors such as a camera, timer, GPS, proximity sensor, Gyro, ambient sensor, accelerometer, and so on. The inputs may be transmitted from another at least one smart audio logging systems. The inputs may be processed accordingly by various modules such as Voice Command Processor 420, Key Command Processor 430, Timer Interface 440, Receiver 450, or Sensor Interface 460 before it is sent to the Audio Logging Processor 230.

Figure 5:
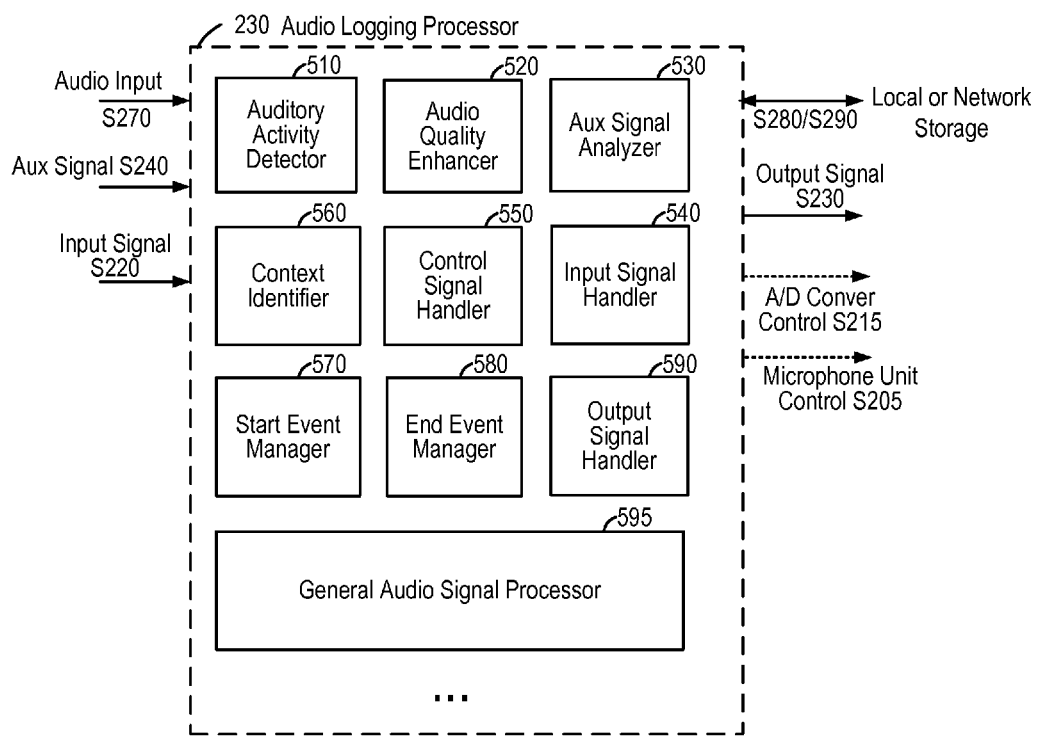
FIG. 5 is a diagram of an embodiment of the Audio Logging Processor 230.

FIG. 5 is an exemplary diagram of an embodiment of the Audio Logging Processor 230. The Audio Logging Processor 230 is the main computing engine of the smart audio logging system and may be implemented in practice with at least one microprocessor or with at least one digital signal processor or with any combination thereof. Alternatively some or all modules of the Audio Logging Processor 230 may be implemented in HW. As is shown in FIG. 5, the Audio Logging Processor 230 may comprise a number of modules dedicated to specific operation as well as more general module named "General Audio Signal Processor 595."

Auditory Activity Detector 510 module or "audio detector" may detect the level of audio activity from the Audio Input S270. The audio activity may be defined as binary classification, such as active or non-active, or as more level of classification if necessary. Various methods to determine the audio level of the Audio Input S270 may be used. For example, the Auditory Activity Detector 510 may be based on signal energy, signal-to-noise ratio (SNR), periodicity, spectral tilt, and/or zero-crossing rate. But it is preferable to use relatively simple solutions in order to maintain a computational complexity as low as possible which in turn helps to extend battery life. Audio Quality Enhancer 520 module may improve the quality of the Audio Input S270 by suppressing background noise actively or passively; by cancelling acoustic echo; by adjusting input gain; or by improving the intelligibility of the Audio Input S270 for conversational speech signal.

Aux Signal Analyzer 530 module may analyze the auxiliary signal from the Auxiliary Data Unit 280. For example, the auxiliary signal may include a scheduling program such as calendaring program or email client program. It may also include additional databases such as dictionary, employee profile, or various audio and speech parameters obtained from $3^{rd}$ party source or training data. Input Signal Handler 540 module may detect, process, or analyze the Input Signal S220 from the Input Processing Unit 250. Output Signal Handler 590 module may generate the Output Signal S230 accordingly to the Output Processing Unit 240.

Control Signal Handler 550 handles various control signals that may be applied to peripheral units of the smart audio logging system. Two examples of the control signals, A/D Converter Control S215 and Microphone Unit Control S205, are disclosed in FIG. 5 for exemplary purposes. Start Event Manager 570 may be configured to handle, detect, or generate a start event indicator. The start event indicator is a flag or signal indicating that smart audio logging may be ready to start. It may be desirable to use the start event indicator for the Audio Logging Processor 230 to switch its internal state if its operation is based on a state machine. It should be obvious for one skilled in the art that the start event indicator is a conceptual flag or signal for the understanding of operation of the Audio Logging Processor 230. In one embodiment, it may be implemented using one or more variables in SW implementation, or one or more hard-wired signals in HW design. The start event indicator can be a single level in which the Start Event Indicator S910 is triggered when one or more conditions are met or a multi level in which the actual smart audio logging is initiated is triggered when more than one level of start event indicators are all triggered.

General Audio Signal Processor 595 is a multi-purpose module for handling all other fundamental audio and speech signal processing methods not explicitly presented in the present application but still necessary for successful implementation. For example, these signal processing methods may include but not limited to time-to-frequency or frequency-to-time conversions; miscellaneous filtering; signal gain adjustment; or dynamic range control. It should be noted that each module disclosed separately in FIG. 5 is provided only for illustration purposes of the functional description of the Audio Logging Processor 230. In one embodiment, some modules can be combined into a single module or some modules can be even further divided up into smaller modules in real-life implementation of the system. In another embodiment, all of the modules disclosed in FIG. 5 may be integrated as a single module.

Figures 6, 7:
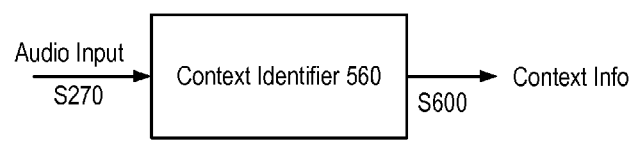
FIG. 6 is a diagram illustrating examples of context information S600.
FIG. 7 is a diagram of an embodiment of context identifier 560.

FIG. 6 is a diagram illustrating examples of context information S600. Unless indicated otherwise, the term "context" (or "context information S600") refers to information of the user such as identification, emotion, habits, biological condition, or engaging activity; physical environment such as absolute or relative location; information on the content such as keyword or class identification; or social environment such as social interaction or business activity. FIG. 7 is a diagram of an embodiment of Context Identifier 560. The Context Identifier 560 is part of the Audio Logging Processor 230 and extracts the context information S600 from the Audio Input S270. In one embodiment, the Context Identifier 560 may be configured to be implemented on dedicated HW engine or on digital signal processor.

Figure 8:
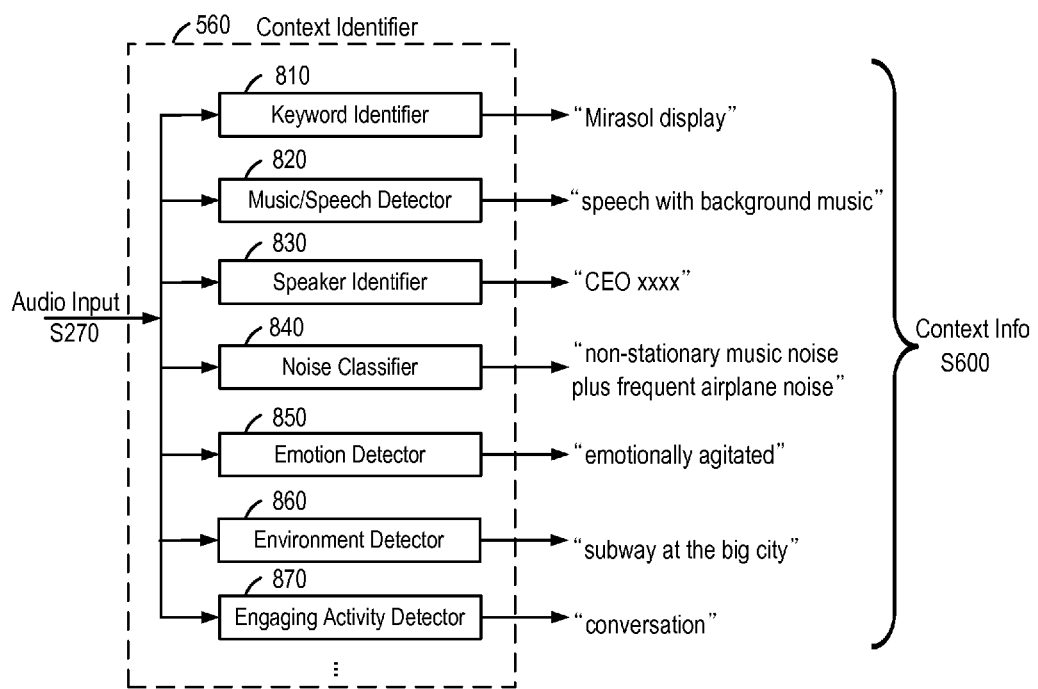
FIG. 8 is a diagram of an exemplary embodiment of the context identifier 560 and the context information S600.

FIG. 8 is a diagram of an exemplary embodiment of the Context Identifier 560 and the context information S600. Keyword Identifier analyzes the Audio Input S270 and recognizes important keywords out of conversational speech content. The recognition process may be based on an auxiliary database such as dictionary or look-up tables storing one or more vocabularies. Music/Speech Detector may be configured to classify the Audio Input S270 signal as more than one categories based on the characteristic of the input signal. The detection may be based on the identification of audio or speech parameters and the comparison of the identified audio or speech parameters to one or more thresholds. Classification within the scope of the present application may be regarded as detection interchangeably.

The Music/Speech Detector 820 also may be configured to classify the input signal into multi-level classification. For example, in one embodiment of the Music/Speech Detector 820, it may classify the input signal into first-level classification such as "Music," or "Speech," or "Music+Speech." Subsequently, it may further determine second-level classification such as "Rock," "Pop," or "Classic," for the signal classified as "Music" at the first-level classification stage. In the same manner, it may also determine a second-level classification such as "Business Conversation," "Personal Conversation," or "Lecture," for the signal classified as "Speech" at the first-level classification stage.

Speaker Identifier 830 may be configured to detect the identification of speaker for speech signal input. Speaker identification process may be based on characteristic of input speech signal such as signal or frame energy, signal-to-noise ratio (SNR), periodicity, spectral tilt, and/or zero-crossing rate. The Speaker Identifier 830 may be configured to identify simple classification such as "Male Speaker" or "Female Speaker"; or to identify more sophisticated information such as name or title of the speaker. Identifying the name or title of the speaker could require extensive computational complexity. It becomes even more challenging when the Speaker Identifier 830 has to search large number of speech samples for various reasons.

For example, let us assume the following hypothetical situation. Company X has overall 15,000 of employees and a user Y has to attend a series of work-related audio conference meetings per day using his mobile device equipped with smart audio logging feature. The user Y wants to identify speakers in real-time when a number of speakers, employees of the company X, involved in conversation. First, speech samples or speech characteristics extracted from the speech samples may not be available in the first place for all employees. Second, even if they are already available in the local memory or at the remote server side connected via wireless channel, searching that large number of speech samples in real time at the mobile device may be extremely challenging. Third, even if the searching may be done at the remote server side and the computing power of the server may be significantly higher than that of the mobile device, the real-time processing still could be challenging considering Rx/Tx transmission latency. These problems may become manageable if additional information is available from an auxiliary database. For example, if the list of conference participants is available from calendaring program, the Speaker Identifier may effectively reduce the number of people to be searched significantly by narrowing down the search space.

Environment Detector 850 may be configured to identify an auditory scene based on one or more characteristics of input speech signal such as frame energy, signal-to-noise ratio (SNR), periodicity, spectral tilt, and/or zero-crossing rate. For example, it may identify the environment of the current input signal as "Office," "Car," "Restaurant," "Subway," "Ball Park," and so on.

Noise Classifier 840 may be configured to classify the characteristics of background noise of the Audio Input S270. For example, it may identify the background noise as "Stationary vs. Non-stationary," "Street noise," "Air plane noise," or combination thereof. It may classify the background noise based on severity level of it such as "Severe" or "Medium." The Noise Classifier 840 may be configured to classify the input in a single state processing or multi-stage processing.

Emotion Detector 850 may be configured to detect the emotion of a speaker for conversational speech or the emotional aspect of music content. Music consists of a number of interesting acoustic parameters. For example, music may include rhythms, instruments, tones, vocals, timbres, notes, and lyrics. These parameters may be used to detect or estimate the emotion of a speaker for one or more emotion categories such as happiness, anger, fear, victory, anxiety, or depression. Engaging Activity Detector 870 may be configured to detect the activity of the speaker based on the characteristics of the Audio Input S270. For example, it may detect that the speaker is "Talking," "Running," "Walking," "Playing sports," "In class," or "Shopping." The detection may be based on speech parameters and/or music signal parameters. The detection may also be configured to get the supplementary information from the Auxiliary Data Unit 280 or the other modules in FIG. 8. For example, the Emotion Detector 850 may be configured to use the information from the Environment Detector 860, the Noise Classifier 840, or any other combination of the modules disclosed in FIG. 8.

Figure 9A:
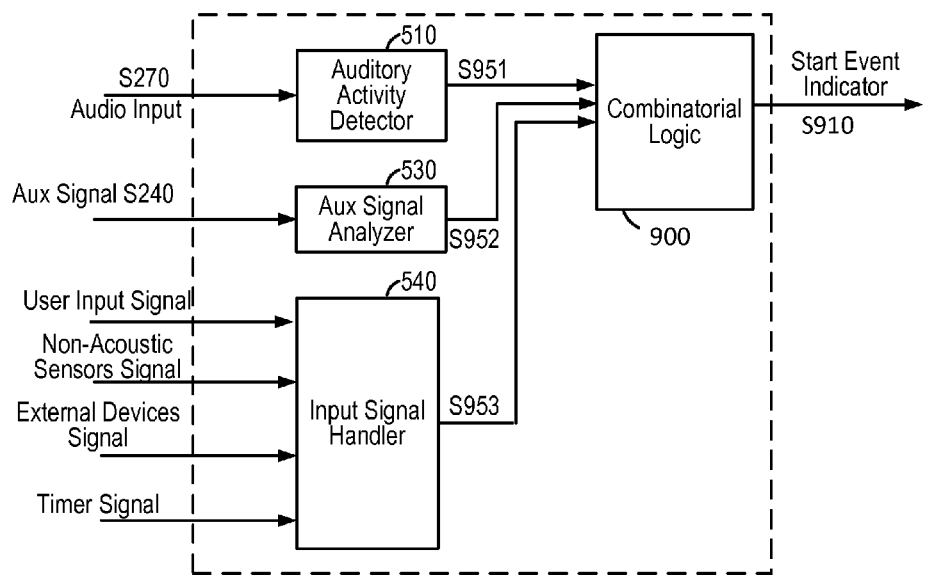
FIG. 9A is an embodiment of the generation mechanism of a single-level start event indicator.
Figure 9B:
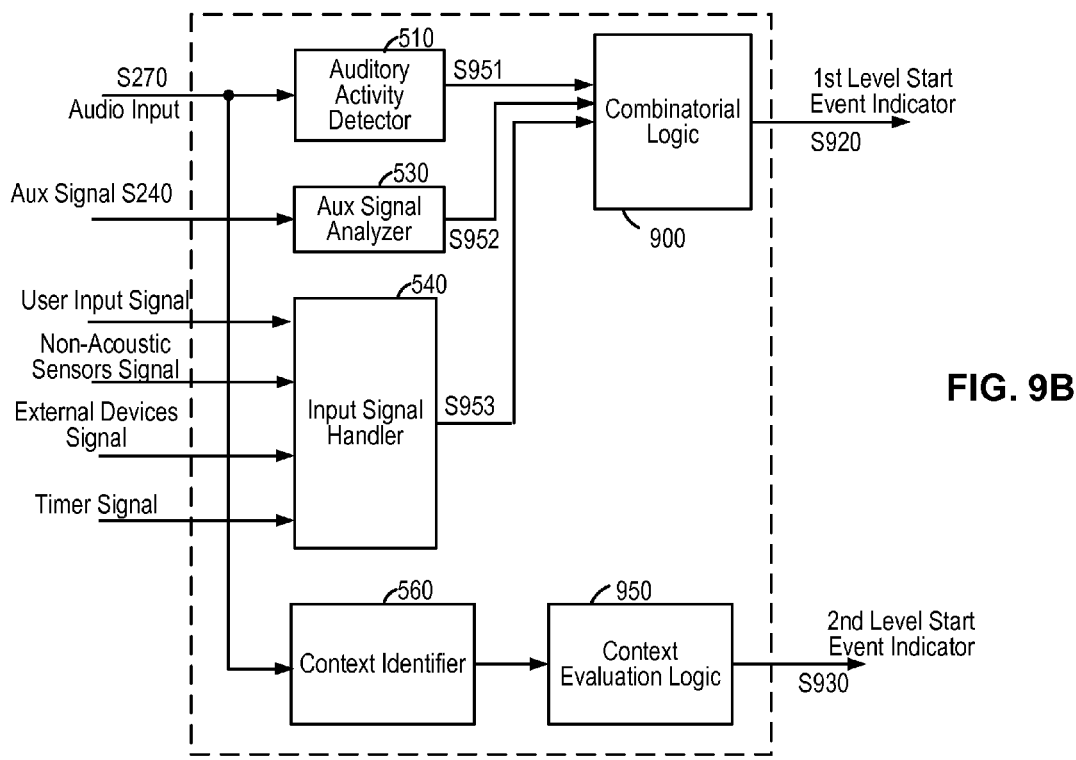
FIG. 9B is another embodiment of the generation mechanism of a single-level start event indicator.

FIG. 9A and FIG. 9B are diagrams of an exemplary embodiment of the generation mechanism of single-level and multi-level start event indicators, respectively. A single-level start event indicator is desirable for relatively simple starting mechanism embodiment while multi-level start event indicator is desirable for rather complex starting mechanism embodiment whereby more aggressive stage-by-stage power up scheme is desirable for efficient power consumption. The Start Event Manager 570 may be configured to generate the Start Event Indicator S910 according to any combination of the outputs, or internal triggering signals, from the Auditory Activity Detector 510, the Aux Signal Analyzer 530, or the Input Signal Handler 540. For example, the Auditory Activity Detector 510 may be configured to generate an internal triggering signal based on the activity of the Audio Input S270 when one or more interesting auditory events or activities are detected.

The Aux Signal Analyzer 530 may also generate an internal triggering signal according to the schedule of the user's calendaring program. A specific meeting that the user wanted to record may automatically generate the internal triggering signal without any manual intervention from the user. Alternatively, Aux Signal Analyzer 530 may be configured to decide such decisions based on explicit or implicit priorities of the meeting. The generation of the internal triggering signal may be initiated from inputs other than the analysis of the Audio Input S270 or Aux Signal. Such inputs may include the user's voice or manual key controls; timer; signal from non-acoustic sensors such as camera, timer, GPS, proximity sensor, Gyro, ambient sensor, or accelerometer; or the signal transmitted from another at least one smart audio logging system. Combinatorial Logic 900 may be configured to generate the Start Event Indicator S910 based on certain combination mechanisms of the internal triggering signals. For example, combinatorial logic may be configured to generate the Start Event Indicator S910 according to OR operation or AND operation of the internal triggering signals from the Auditory Activity Detector 510, the Aux Signal Analyzer 530, or the Input Signal Handler 540. In another embodiment, it may be configured to generate the Start Event Indicator S910 when one or more internal triggering signals have been set or triggered.

Referring back to FIG. 9B, the Start Event Manager 570 may be configured to generate the 1st-level Start Event Indicator S920 and then 2nd-level Start Event Indicator S930 before the start of actual logging. The multi-level Start Event Indicator mechanism disclosed herein may be preferable to determine a more precise starting point of audio logging by relying on more than one level of indicators. An exemplary implementation of the multi-level Start Event Indicator may be configured to adopt relatively simple and low-complexity decision mechanism for 1st-level Start Event Indicator S920 and to adopt sophisticated and high-complexity decision mechanism for 2nd-level Start Event Indicator S930. In one embodiment, the generation of 1st-level Start Event Indicator S920 may be configured to be substantially similar to the method as that of the Start Event Indicator S910 in FIG. 9A. In contrast with FIG. 9A, the Audio Logging Processor 230 doesn't start the actual logging upon triggering of the 1st-level Start Event Indicator S920 but instead it may preferably wake up, or interchangeably power up, additional modules necessary to trigger 2nd-level Start Event Indicator S930 signal based on further in-depth analysis of the Audio Input S270. These modules may include the Context Identifier 560 and Context Evaluation Logic 950. The Context Identifier 560 then will analyze the Audio Input S270 according to methods disclosed in FIG. 8 and may detect or identify a number of the Context Information S600 that may be evaluated by the Context Evaluation Logic 950. The Context Evaluation Logic 950 may be configured to trigger the 2nd-level Start Event Indicator S930 according to various internal decision methods. Such methods for example may include the calculation of weighted sum of priority for the output of some or all of sub modules disclosed in FIG. 8, and the comparison of the weighted sum to one or more thresholds. It should be noted that the Context Evaluation Logic 950 may be implemented with either SW or HW, or it may be implemented as part of the General Audio Signal Processor 595 in FIG. 8.

Figure 10:
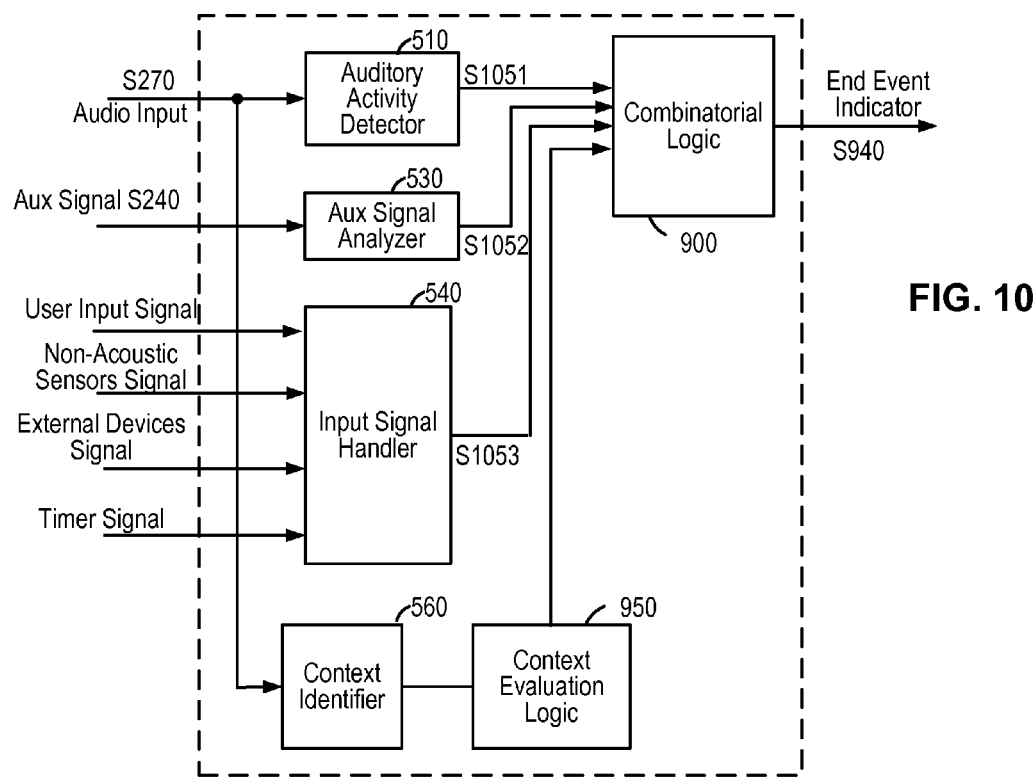
FIG. 10 is an embodiment of the generation mechanism of an end event indicator.

FIG. 10 is an embodiment of the end event indicator generation mechanism. The End Event Indicator S940 may be generated by End Event Manager 580 according to any combination of the outputs, or internal triggering signals, from the Auditory Activity Detector 510, the Aux Signal Analyzer 530, or the Input Signal Handler 540. The operation of modules in FIG. 10 is substantially similar to the method explained in either FIG. 9A or FIG. 9B, but the internal triggering signals from each module is typically triggered when each module detects indications to stop the actual logging or indications to switch to power-efficient mode from its current operational mode. For example, the Auditory Activity Detector 510 may trigger its internal triggering signal when the audio activity of the Audio Input S270 becomes significantly reduced compared or similarly the Aux Signal Analyzer 530 may trigger its internal triggering signal when the meeting has reached its scheduled time to be over. The Combinatorial Logic 900 may be configured to generate the End Event Indicator S940 based on certain combination mechanisms of the internal triggering signals. For example, it may be configured to generate the End Event Indicator S940 according to, for example, OR operation or AND operation of the internal triggering signals from the Auditory Activity Detector 510, the Aux Signal Analyzer 530, or the Input Signal Handler 540. In another embodiment, it may be configured to generate the End Event Indicator S940 when one or more internal triggering signals have been set or triggered.

Figure 11:
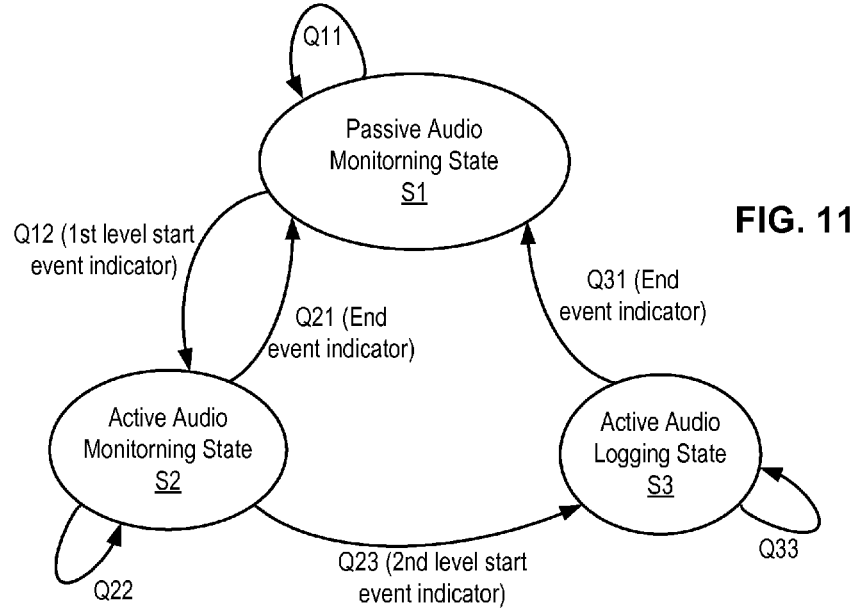
FIG. 11 is a diagram of a first exemplary embodiment illustrating the Audio Logging Processor 230 states and transition thereof.

FIG. 11 is a diagram of a first exemplary embodiment illustrating internal states of Audio Logging Processor 230 and transition thereof for the multi-level start event indicator system. The default state at the start-up of the smart audio logging may be the Passive Audio Monitoring State S1 during which the mobile device comprising smart audio logging feature is substantially equivalent to typical idle mode state. During the Passive Audio Monitoring State S1, it is critical to minimize the power consumption because statistically the mobile device stays in this state for most of time. Therefore, most of modules of the smart audio logging system, except a few modules required to detect the activity of the Audio Input S270, may be configured to remain in sleep state or in any other power-saving modes. For example, such a few exceptional modules may include the Audio Capturing Unit 215, the Buffer 220, or the Auditory Activity Detector 510. In one embodiment, these modules may be configured to be on constantly or may be configured to wake up intermittently.

The state could be changed from the Passive Audio Monitoring State S1 to the Active Audio Monitoring State S2 upon triggering of the 1st-level Start Event Indicator S920. During the Active Audio Monitoring State S2, the smart audio logging system may be configured to wake up one or more extra modules, for example, such as the Context Identifier 560 or the Context Evaluation Logic 950. These extra modules may be used to provide in-depth monitoring and analysis of the Audio Input S270 signal to determine if the 2nd-level Start Event Indicator S930 is required to be triggered according to the description presented in FIG. 9B. If the 2nd-level Start Event Indicator S930 is triggered finally, then the system transitions to the Active Audio Logging State S3 during which the actual audio logging will follow. The detailed description of exemplary operation in each state will be presented in the following paragraphs. If the End Event Indicator S940 is triggered during the Active Audio Monitoring State S2, the system may be configured to put the extra modules that were powered up during the state into sleep mode and switch the state back to the Passive Audio Monitoring State S1. In a similar fashion, if the End Event Indicator S940 is triggered during the Active Audio Logging State S3, the system may be configured to stop audio logging and switch the state back to the Passive Audio Monitoring State S1.

Figure 12:
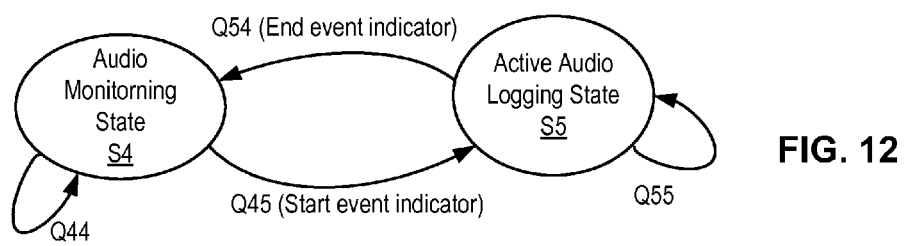
FIG. 12 is a diagram of a second exemplary embodiment illustrating the Audio Logging Processor 230 states and transition thereof.

FIG. 12 is a diagram of a second exemplary embodiment illustrating internal states of Audio Logging Processor 230 and transitions thereof for the single-level start event indicator system. The embodiment herein is simpler than the embodiment disclosed in FIG. 11 for there are only two available operating states. The default state at the start-up of the smart audio logging may be the Audio Monitoring State S1 during which the mobile device comprising smart audio logging feature is substantially equivalent to typical idle mode state. During the Audio Monitoring State S4, it is preferable to minimize the power consumption because statistically the mobile device stays in this state for most of time. Therefore, most of modules of the smart audio logging system, except a few modules minimally required to detect the activity of the Audio Input S270, may be configured to remain in sleep state or in any other power-saving modes. For example, the few exceptional modules may include the Audio Capturing Unit 215, the Buffer 220, or the Auditory Activity Detector 510. In one embodiment, these modules may be configured to be on constantly or may be configured to wake up intermittently.

The state could be changed from the Audio Monitoring State S4 to the Active Audio Logging State S5 upon triggering of the Start Event Indicator S910. During the Active Audio Logging State S5, the actual audio logging will follow. The detailed description of typical operation in each state will be presented in the following paragraphs. If the End Event Indicator S940 is triggered during the Active Audio Logging State S5, the system may be configured to stop audio logging and switch the state back to the Audio Monitoring State S4.

Figure 13:
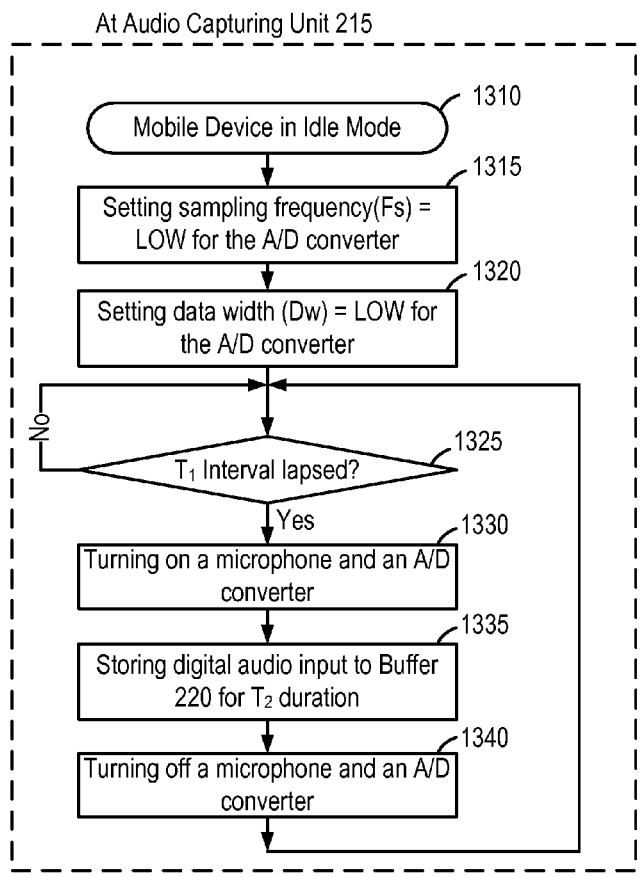
FIG. 13 is a flowchart of an embodiment of the Audio Capturing Unit 215 during passive audio monitoring state S1 or audio monitoring state S4.

FIG. 13 is a flowchart of an embodiment of the Audio Capturing Unit 215 during Passive Audio Monitoring State S1 of FIG. 11 or Audio Monitoring State S4 of FIG. 12. The mobile device comprising the smart audio logging feature is initially assumed to be in idle mode. Two intervals are presented in FIG. 13. $T_1$ represents a microphone wake up interval and $T_2$ represents a duration that a microphone stays on. The flowcharts presented herein are only for exemplary purpose and it should be obvious for one skilled in the art that some of the blocks in the flowchart may be reordered interchangeably within the scope of the present application. For example, in one embodiment the blocks dedicated for settings of an A/D converter 1315, 1320 in FIG. 13 may be configured to be processed after the block that turns on a microphone and/or an A/D converter 1330. In such case, the blocks 1315, 1320 may be configured to run at every $T_1$ interval instead of just one time at the start of operation.

Additionally, FIG. 13 discloses several important concepts fundamental to the smart audio logging implementation. The A/D converter may be programmed to maintain low resolution in terms of sampling frequency and/or data width. The low resolution setting helps to minimize the size of the data to be processed and/or stored at the Buffer 220. High resolution may be used to improve the precision of the digitized audio input. However, in an exemplary implementation, it may be preferable to use low resolution setting due to the increased buffer usage and power consumption of high resolution setting. The low resolution setting may be desirable considering that the purpose of Audio Monitoring States S1, S2, S4 is mainly to sense and monitor environments waiting for the right timing to start active audio logging.

A microphone may be configured to wake up at every $T_1$ interval, microphone wake up interval, and collect the Audio Input S270 for $T_2$ duration, microphone ON duration. The values of $T_1$ or $T_2$ may be pre-determined at a fixed interval or may be dynamically adapted during run time. In an exemplary implementation of the system, $T_1$ may be bigger than $T_2$ or $T_2$ may be determined to be smaller but proportional to $T_1$. If there is more than one microphone in the Microphone Unit 200, each microphone may be configured to have the same interval or some microphone may be configured to have different intervals as to others. In one embodiment, some of microphones may not be turned on at all during the Passive Audio Monitoring State S1 of FIG. 11 or Audio Monitoring State S4 of FIG. 12. In another embodiment, one or more microphones may be turned on constantly, which may be the mere special case in which $T_1$ is identical to $T_2$.

Figure 14:
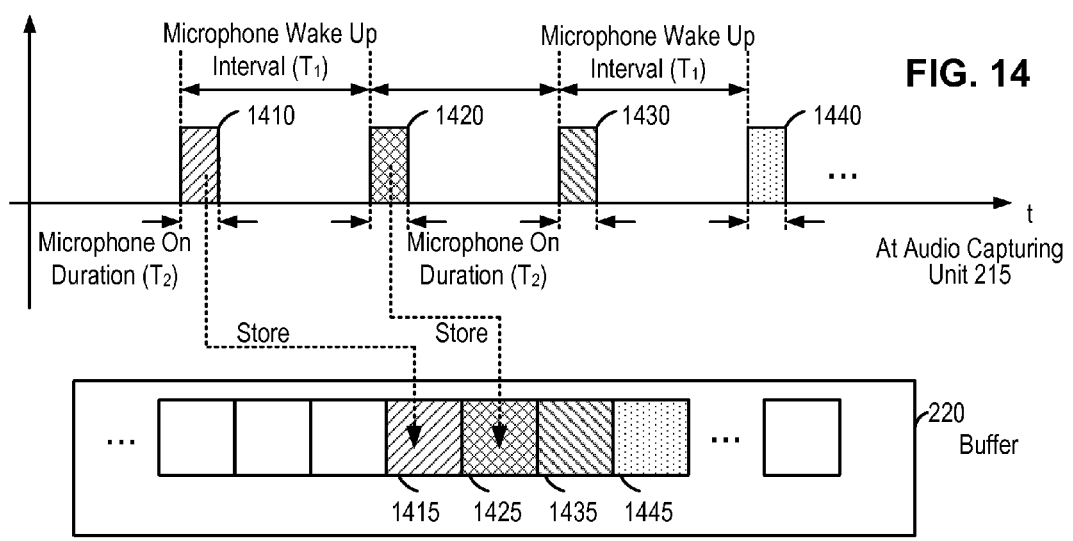
FIG. 14 is a diagram of an example for storing digital audio input to the Buffer 220 at the Audio Capturing Unit 215 during passive audio monitoring state S1 or audio monitoring state S4.

Digitized audio inputs during $T_2$ duration may be stored to the Buffer 220 at every $T_1$ interval and the stored digital audio input may be accessed and processed by the Audio Logging Processor 230 at every $T_3$ interval. This may be better understood with FIG. 14, which shows an exemplary diagram for storing digital audio input to the Buffer 220 at the Audio Capturing Unit 215 during the Passive Audio Monitoring State S1 or the Audio Monitoring State S4. The stored digital audio input 1415, 1425, 1435, 1445 to the Buffer 220 may be analyzed by the Auditory Activity Detector 510 within the Audio Logging Processor 230. In an exemplary implementation, the $T_3$ interval may be identical to the $T_2$ duration or may be determined with no relation to $T_2$ duration. When the $T_3$ interval is bigger than the $T_2$ duration, the Auditory Activity Detector 510 may be configured to access and process more than the size of the data stored in the Buffer 220 during one cycle of $T_1$ interval.

Figure 15:
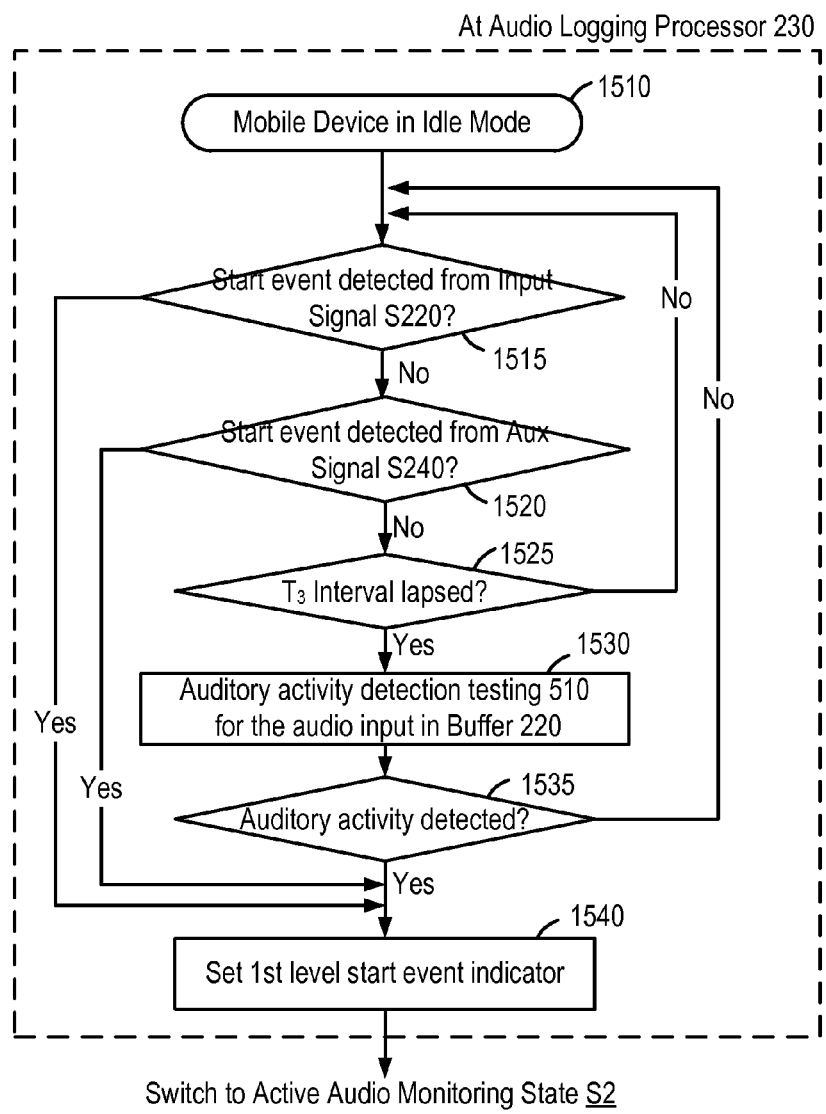
FIG. 15 is a flowchart of an embodiment of the Audio Logging Processor 230 during passive audio monitoring state S1.

FIG. 15 is a flowchart of an embodiment of the Audio Logging Processor 230 during the Passive Audio Monitoring State S1. At this state, it may be desirable that most of the modules within the Audio Logging Processor 230 may be in a power-efficient mode except minimum number of modules required for the operation of FIG. 15. These required modules may be the modules shown in FIG. 9B. Therefore, the flow chart in FIG. 15 may be better understood with FIG. 9B. If the start event request originated from the Input Signal S220 detected 1515 by the Input Signal Handler 540 when the mobile device is in idle mode, it may trigger the 1st-level Start Event Indicator 1540. If the start event request originated from the Aux Signal S240 is detected 1520 by the Aux Signal Analyzer 530, it may trigger the 1st-level Start Event Indicator 1540. FIG. 15 also shows that the Auditory Activity Detector 510 analyze the data 1530 in the Buffer 220 at every $T_3$ interval and may determine if any auditory activity indicating that further in-depth analysis may be required has been detected or not. The detailed descriptions of exemplary embodiments for this testing were previously disclosed in the present application along with FIG. 5. If the auditory activity of interesting is detected, it may trigger the 1st-level Start Event Indicator 1540.

One skilled in the art would recognize that the order of blocks in FIG. 15 is only for exemplary purposes in explaining the operation of the Audio Logging Processor 230 and therefore there may be many variations that may be functionally equivalent or substantially equivalent to FIG. 15. For example, the one block 1515 and the other block 1520 may be reordered in such a way that 1520 may be executed first or they may be reordered in such a way that they may not be executed in sequential order.

Figure 16:
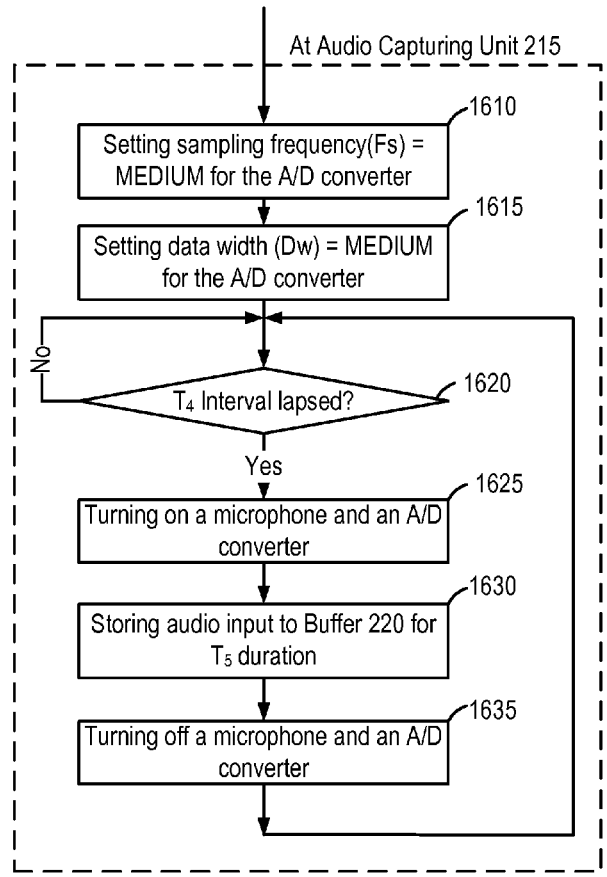
FIG. 16 is a flowchart of an embodiment of the Audio Capturing Unit 215 during active audio monitoring state S2.

FIG. 16 is a flowchart of an embodiment of the Audio Capturing Unit 215 during the Active Audio Monitoring State S2. The operation of the Audio Capturing Unit 215 in FIG. 16 is very similar to the operation disclosed in FIG. 13 except few differences and therefore only difference parts may be described herein. The A/D converter may be programmed to maintain higher resolution, labeled as "MEDIUM" in FIG. 16, in terms of sampling frequency and/or data width than "LOW" resolution in FIG. 13. The medium resolution setting may help to obtain digitized audio input data in better accuracy, which in turn may be beneficial for the Audio Logging Processor 230 to extract more reliable context information S600.

A microphone may be configured to wake up at every $T_4$ interval; the microphone wake up interval, and collect the Audio Input S270 for $T_5$ duration; the microphone ON duration. The values of $T_4$ or $T_5$ may be identical or substantially similar to the values of $T_1$ or $T_2$, respectively. However, it may be preferable to set $T_4$ to be smaller than T1 because it may be beneficial for the Audio Logging Processor 230 to extract more accurate context information S600. In another embodiment, the values of $T_4$ or $T_5$ may be pre-determined at a fixed interval or may be dynamically adapted during run time. In another embodiment in which there are a plurality of microphones in the Microphone Unit 200, one or more microphones may be turned on constantly, which may be the mere special case in which $T_4$ is identical to $T_5$.

Figure 17:
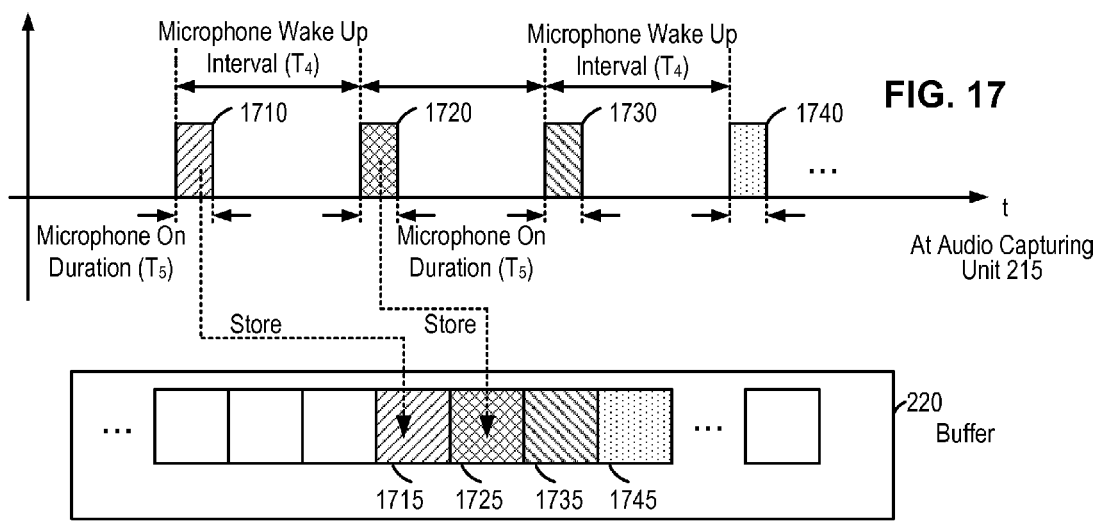
FIG. 17 is a diagram of example for storing digital audio input to the Buffer 220 at the Audio Capturing Unit 215 during active audio monitoring state S2.

FIG. 17 is an example diagram for storing a digital audio input to the Buffer 220 at the Audio Capturing Unit 215 during the Active Audio Monitoring State S2. The stored digital audio input 1715, 1725, 1735, 1745 to the Buffer 220 may be analyzed by the Context Identifier 560 and the Context Evaluation Logic 950 within the Audio Logging Processor 230 at every $T_6$ interval. In an exemplary implementation, the $T_6$ interval may be identical to the $T_5$ duration or alternatively may be determined with no relation to the $T_5$ duration. When the $T_6$ interval is larger than the $T_5$ duration, the Auditory Activity Detector 510 may be configured to access and process the data stored in the Buffer 220 during one or more cycles of $T_4$ interval.

Figure 18:
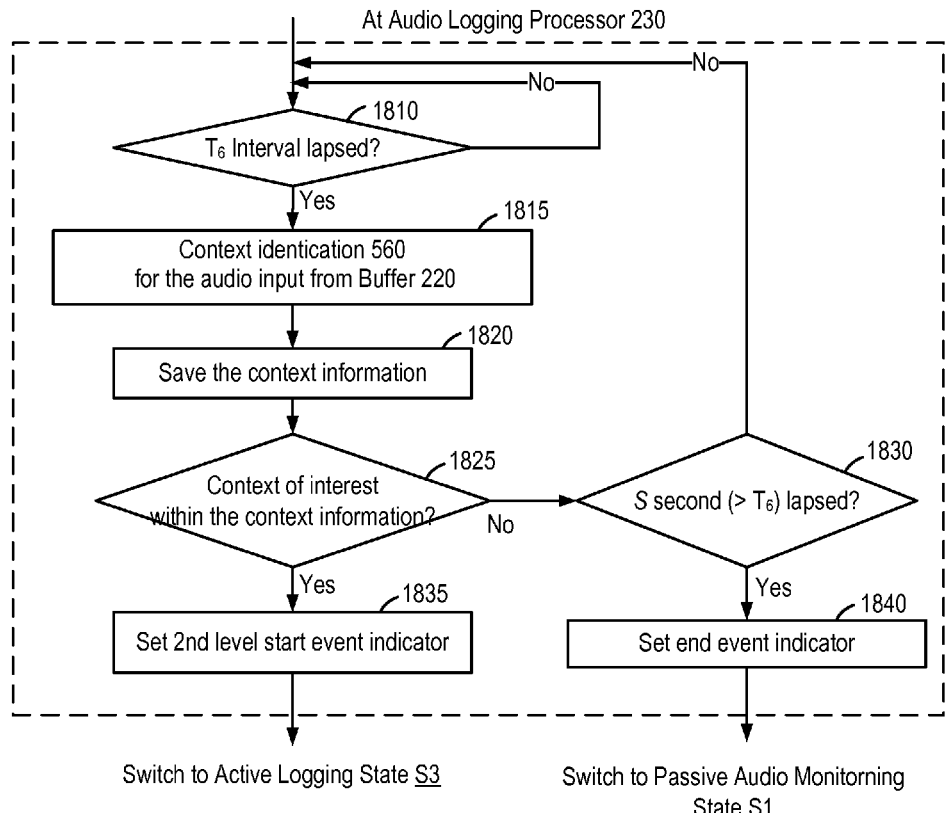
FIG. 18 is a flowchart of an embodiment of the Audio Logging Processor 230 during active audio monitoring state S2.

FIG. 18 is a flowchart of an embodiment of the Audio Logging Processor 230 during the Active Audio Monitoring State S2. In this state, the Context Identifier 560 within the Audio Logging Processor 230 analyzes the Audio Input S270 stored in the Buffer 220 and identifies 1815 the context information S600 at every $T_6$ interval. The context information S600 may be configured to be stored 1820 in memory location for future reference. The Context Evaluation Logic 950 may evaluate 1825 the context information S600 and it may trigger the 2nd-level Start Event Indicator 1835 according to various internal decision methods. Such decision methods for example may include the calculation of weighted sum of priority for the output of some or all of sub modules disclosed in FIG. 8, and the comparison of the weighted sum to one or more thresholds. FIG. 18 also shows the exemplary mechanism of triggering the End Event Indicator S940. The End Event Indicator S940 may be triggered when the Context Evaluation Logic 950 didn't trigger the 2nd-level Start Event Indicator S930 for the last S duration, which may be preferably much longer than $T_6$ interval. In another embodiment, the End Event Indicator S940 may be generated when the End Event Manager 580 detects the signals S1052, S1053 from the Aux Signal Analyzer 530 or the Input Signal Handler 540 as shown in FIG. 10.

Figure 19:
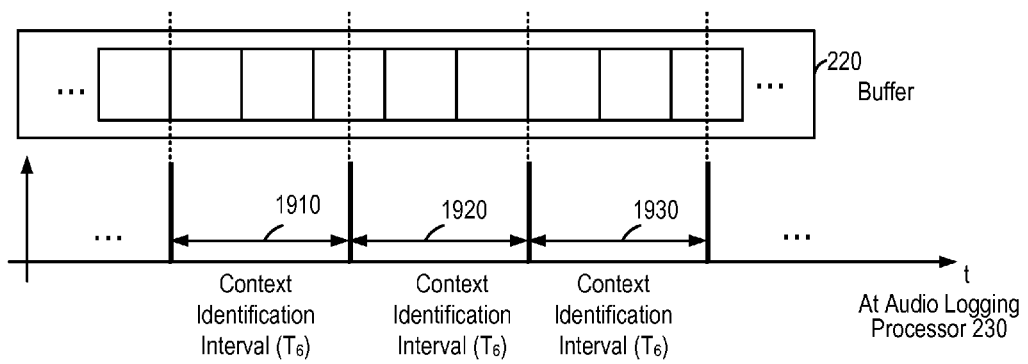
FIG. 19 is a diagram of example of context identification embodiment at the Audio Logging Processor 230 during active audio monitoring state S2.

FIG. 19 is an example diagram of a context identification embodiment at the Audio Logging Processor 230 during the Active Audio Monitoring State S2. It shows that the context identification process, which is performed by the Context Identifier 560 at every $T_6$ interval, may be configured to start asynchronously to $T_4$ interval. $T_6$ interval may be determined in consideration of the size of the Buffer 220 and the trade-off between power consumption and the accuracy of the decision. Too much frequent context identification process, or too small $T_6$ interval, may result in increased power consumption whereas too often context identification process, or too big $T_6$ interval, may result in the accuracy degradation of context information S600.

Figure 20:
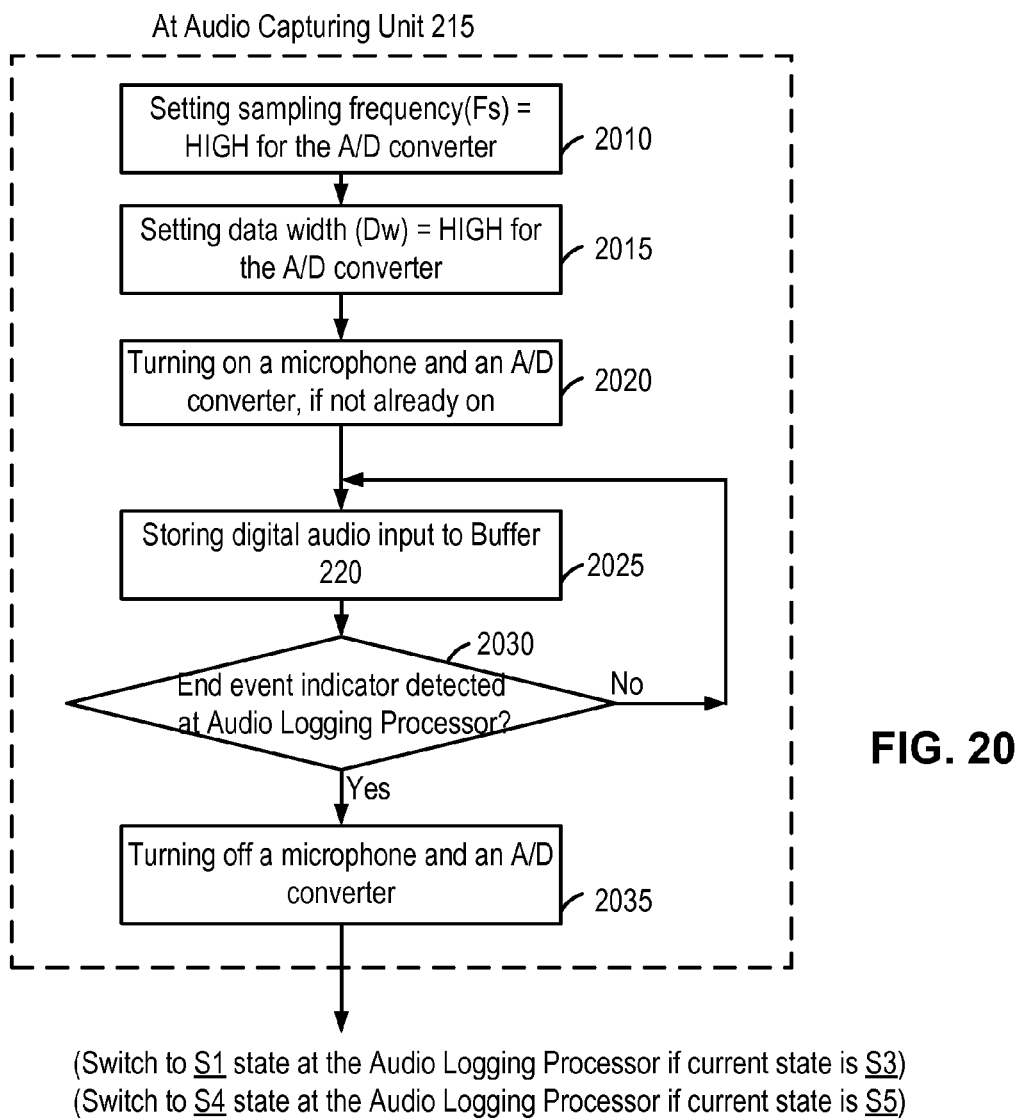
FIG. 20 is a flowchart of an embodiment of the Audio Capturing Unit 215 during active audio logging state S3 or S5.

FIG. 20 is a flowchart of an embodiment of the Audio Capturing Unit 215 during the Active Audio Logging State S3, S5. The A/D converter may be programmed to maintain higher resolution, labeled as "HIGH" herein, in terms of sampling frequency and/or data width compared to "LOW" or "MEDIUM" resolutions in FIG. 13 or FIG. 16. The high resolution setting may increase the size of the audio logging data but it may also help to obtain higher quality audio input data. The resolution setting of the A/D converter may be configured to be dynamically adjusted according to the control signal from the Audio Logging Processor 230. More detailed description is presented in a later part of the present application. At the present state, the Audio Logging Processor 230 may be engaged in logging (storing) audio data into desired storage location. The desired storage may reside in the local mobile device or in the remote server side through wired or wireless connection. The audio logging may continue until the End Event Indicator S940 is detected by the End Event Manger 580 as is shown in FIG. 10.

Figure 21:
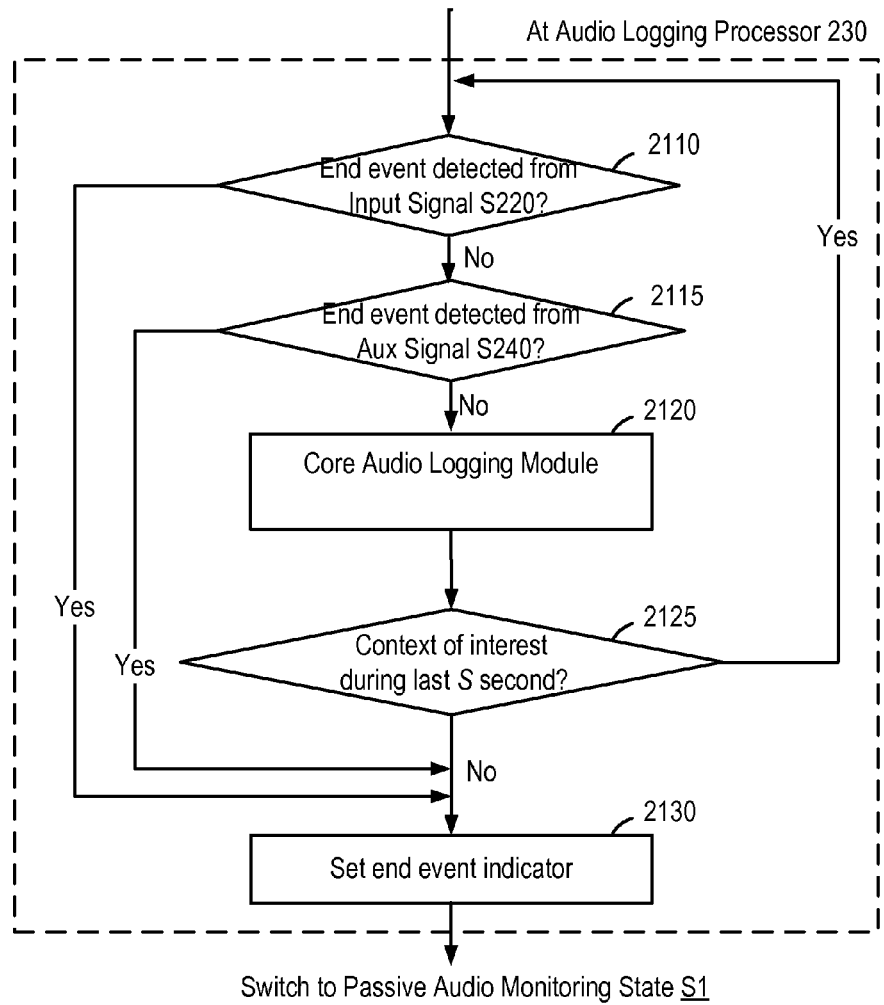
FIG. 21 is a flowchart of an embodiment of the Audio Logging Processor 230 during active audio logging state S3.

FIG. 21 is a flowchart of an embodiment of the Audio Logging Processor 230 during the Active Audio Logging State S3. If the end event request originated from the Input Signal S220 detected 2110 by the Input Signal Handler 540, it may trigger the End Event Indicator 2130. If the end event request originated from the Aux Signal S240 is detected 2115 by the Aux Signal Analyzer 530, it may trigger the End Event Indicator 2130. If there is no end event detected from either the Input Signal Handler 540 or the Aux Signal Analyzer 530, then actual audio logging is performed at the Core Audio Logging Module 2120. During the audio logging, the Context Identifier 560 may be configured to continue to identify the context information S600 and the older identified context information S600 stored in the memory location may be updated by the newer identified context information S600. The detailed description of the internal operation of the Core Audio Logging Module is presented at FIG. 24. While the actual audio logging is in progress, the Context Evaluation Logic 950 may be configured to continue to monitor and analyze the Audio Input S270 and thereby trigger the End Event Indicator S940 when no interesting context information S600 has been detected during a predetermined period of time. An exemplary implementation for the predetermined period of time may include using the audio data during the latest S seconds. This method of generating the End Event Indicator S940 may be referred to as "time-out mechanism." Such testing methods for example may include the calculation of weighted sum of priority for the output of some or all of sub modules disclosed in FIG. 8, and the comparison of the weighted sum to one or more thresholds.

Figure 22:
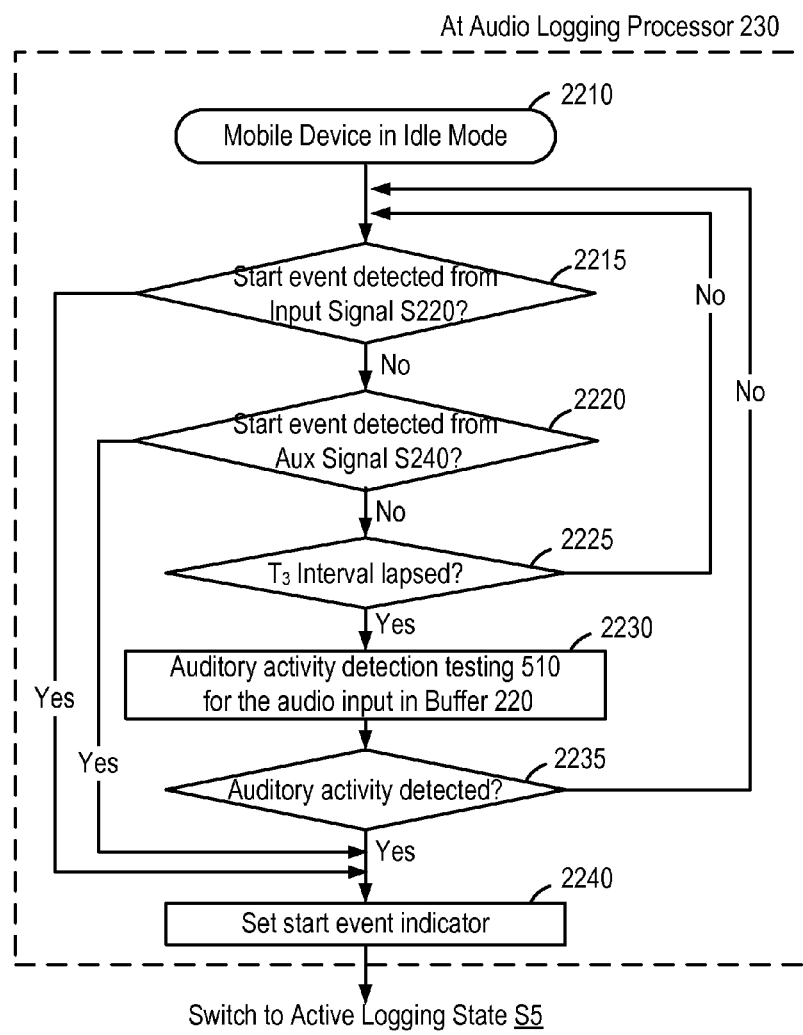
FIG. 22 is a flowchart of an embodiment of the Audio Logging Processor 230 during audio monitoring state S4.

FIG. 22 is a flowchart of an embodiment of the Audio Logging Processor 230 during the Audio Monitoring State S4. The flowchart herein may be configured to be substantially similar to the flowchart in FIG. 15 except that the last block 2240 may trigger the Start Event Indicator instead of the 1st-level Start Event Indicator 1540. This similarity is due to the fact that both the Passive Audio Monitoring State S1 of FIG. 11 and the Audio Monitoring State S4 of FIG. 12 may have identical purposes—sensing the auditory events of environment periodically in power-efficient manner.

Figure 23:
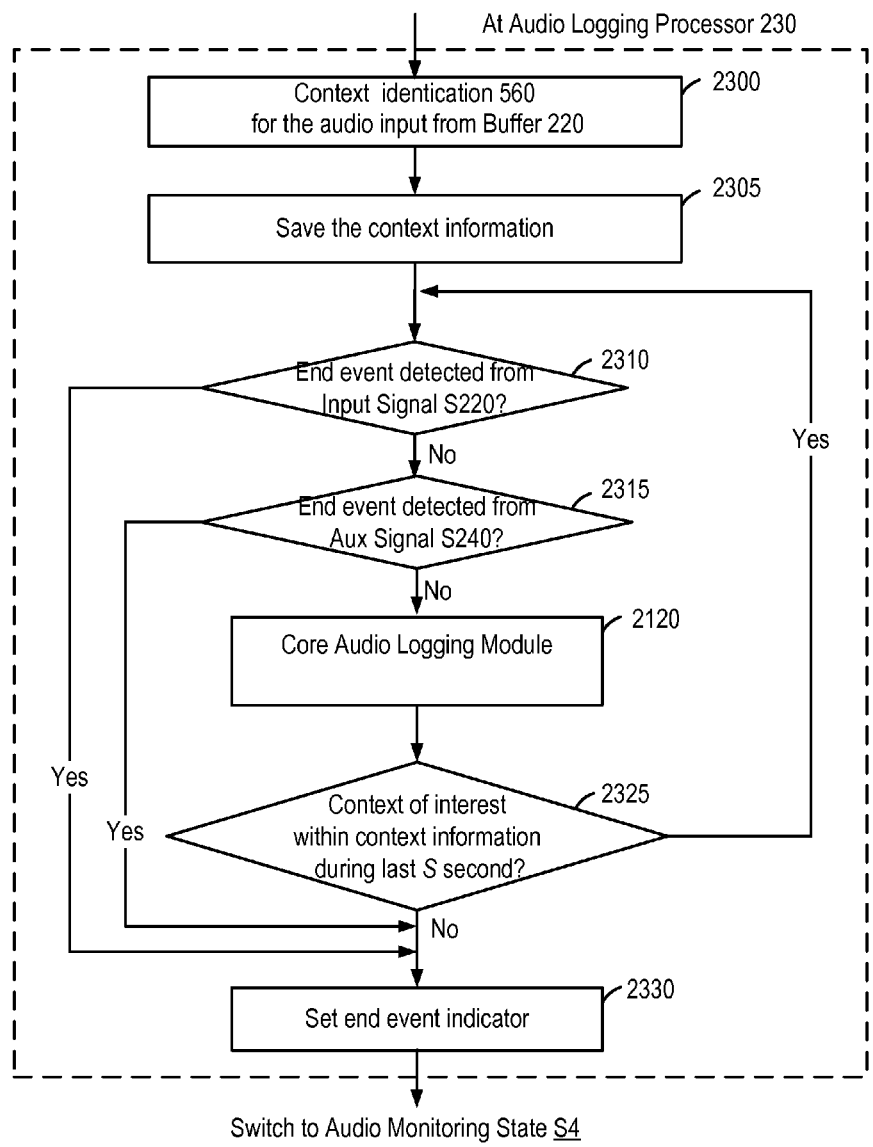
FIG. 23 is a flowchart of an embodiment of the Audio Logging Processor 230 during active audio logging state S5.

FIG. 23 is a flowchart of an embodiment of the Audio Logging Processor 230 during the Active Audio Logging State S5. Because the Active Logging Processor in either S3 or S5 may perform similar operations, the flowchart herein also may be substantially close or identical to the flowchart in FIG. 21 with the exception of additional blocks 2300, 2305 at the beginning of the flow chart. Unlike S3 state where its prior state was always the Active Audio Monitoring State S2 in which the Context Identifier 560 may be configured to identify the context information S600 periodically or continuously depending on the design preference, these additional blocks 2300, 2305 may be required herein because the prior state of S5 is the Audio Monitoring State S4 and no context identification step may be performed at S4 state. If the end event request originated from the Input Signal S220 detected 2310 by the Input Signal Handler 540, it may trigger the End Event Indicator 2330. If the end event request originated from the Aux Signal S240 is detected 2315 by the Aux Signal Analyzer 530, it may trigger the End Event Indicator 2330. If there is no end event detected from either the Input Signal Handler 540 or the Aux Signal Analyzer 530, then actual audio logging is performed at the Core Audio Logging Module 2320. During the audio logging, the Context Identifier 560 may be configured to continue to identify the context information S600 and the older identified context information S600 stored in the memory location may be updated by the newer identified context information S600. The detailed description of the internal operation of the Core Audio Logging Module is presented at FIG. 24. While the actual audio logging is in progress, the Context Evaluation Logic may be configured to continue to monitor and analyze the Audio Input S270 and thereby trigger the End Event Indicator S940 when no interesting context information S600 has been detected during a predetermined period of time. An exemplary implementation for the predetermined period of time may include using the audio data during the latest S duration. This method of generating the End Event Indicator S940 may be called as "time-out mechanism." Such testing method for example may include the calculation of weighted sum of priority for the output of some or all of sub modules disclosed in FIG. 8, and the comparison of the weighted sum to one or more thresholds.

Figure 24:
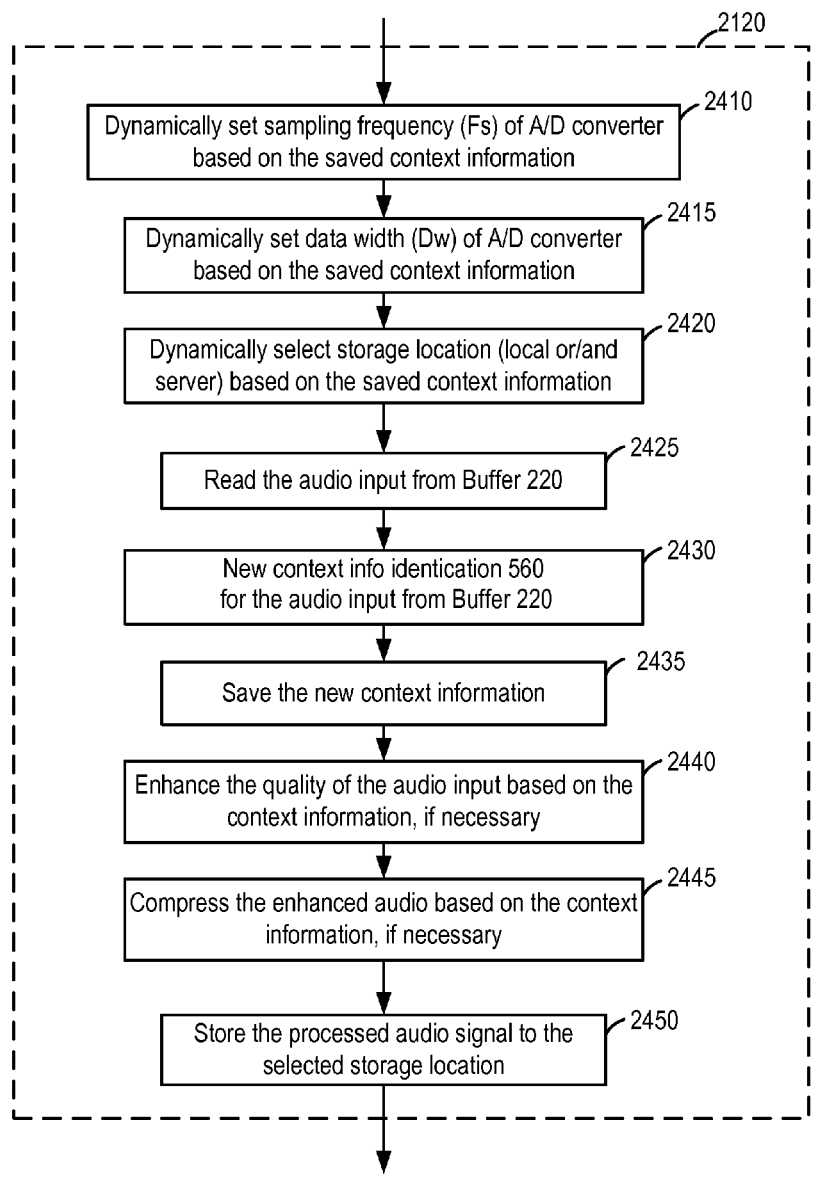
FIG. 24 is a flowchart of an embodiment of core audio logging module during active audio logging states S3 or S5.

FIG. 24 is a flowchart of an embodiment of core audio logging module during the Active Audio Logging States S3, S5. In this exemplary embodiment, first three blocks from top of flowchart 2410, 2415, 2420 show dynamic configuration characteristic of smart audio logging system according to the context information S600. Sampling frequency 2410 and/or data width 2415 of A/D converter can be dynamically reconfigured during the audio logging process based upon the context information S600. The context information S600 typically varies gradually or even abruptly during the entire course of audio logging which may last more than minutes or even hours. For example, the topic of the conversational speech may be changed over time. The background noise or environment of the speaker may change, for example, when the speaker is walking on the street or in transit using public transportation. Also, the contents of the Audio Input S270 may change over time, for example, from conversational speech to music or music plus speech and vice versa. It may be desirable to use a higher resolution of sampling frequency or data width for music content and lower resolution of sampling frequency or data width for mainly speech signal. In another embodiment, the resolution may be configured to be different according to the characteristic of speech content. For example, the system may be configured to use a different resolution for business communication compared to a personal conversation between friends. The blocks 2410, 2415, 2420 for dynamic setting of the configurations of A/D converter and dynamic selection of memory location according to the context information S600 may be re-positioned in different order in between thereof or as opposed to other blocks in the flowchart within the scope of general principle disclosed herein.

The system may also be configured to dynamically select the memory location 2420 based on the context information S600. For example, the system may be configured to store the audio logging data to storage which is remotely connected at the server side when one or more speakers during the conversation turns out to meet a certain profile such as a major business customers, or when the Audio Input S270 substantially includes more music than speech signal. In such cases it may be desirable to use a higher resolution of the A/D converter and therefore require a larger storage space.

The Audio Logging Processor 230 then may be configured to read the audio data 2424 from the Buffer 220. The new Context Information may be identified 2430 from the latest audio data and the new Context Information may be stored 2435 in memory. In another embodiment, the Context Identification process 2430 or the saving process 2434 of the context information S600 may be skipped or re-positioned in a different order as opposed to other blocks in the flowchart within the scope of general principle disclosed herein.

The Audio Logging Processor 230 may be configured to determine 2440 if enhancement of the Audio Input S270 signal is desirable or in such case what types of enhancement processing may be desirable before the processed signal is stored in the selected memory. The determination may be based on the context information S600 or pre-configured automatically by the system or manually by the user. Such enhancement processing may include acoustic echo cancellation (AEC), receiving voice enhancement (RVE), active noise cancellation (ANC), noise suppression (NS), acoustic gain control (AGC), acoustic volume control (AVC), or acoustic dynamic range control (ADRC). In one embodiment, the aggressiveness of signal enhancement may be based on the content of the Audio Input S270 or the context information S600.

The Audio Logging Processor 230 may be configured to determine 2445 if compression of the Audio Input S270 signal is desirable or in such case what types of compression processing may be desirable before the processed signal is stored in the selected memory location. The determination may be based on the context information S600 or pre-configured automatically by the system or manually by the user. For example, the system may select to use compression before audio logging starts based on the expected duration of audio logging preferably based on the calendaring information. The selection of a compression method such as speech coding or audio coding may be dynamically configured based upon the content of the Audio Input S270 or the context information S600. Unless specified otherwise, the compression within the context of the present application may mean source coding such as speech encoding/decoding and audio encoding/decoding. Therefore, it should be obvious for one skilled in the art that the compression may be used interchangeably as encoding and decompression may be used interchangeably as decoding. The encoding parameters such as bitrate, encoding mode, or the number of channel may be also dynamically configured based on the content of the Audio Input S270 or the context information S600.

Figure 25:
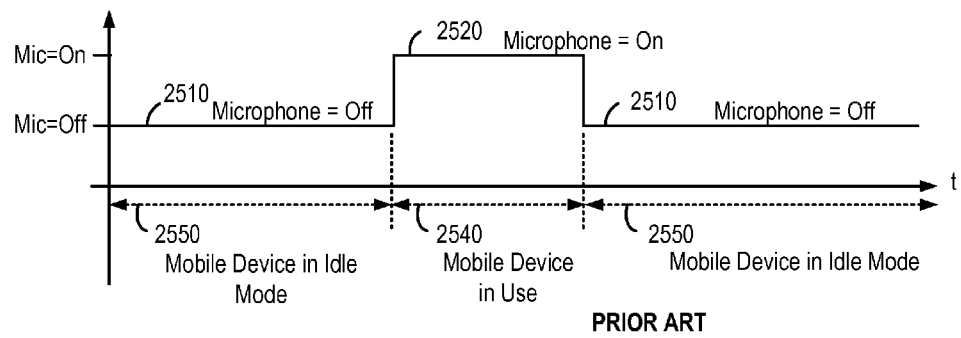
FIG. 25 is a diagram of an embodiment of single microphone ON and OFF control.

FIG. 25 is a diagram of an embodiment of a single microphone ON and OFF control according to the conventional microphone control. When a mobile device is in idle mode 2550, a microphone and related blocks required for the operation of the microphone such as A/D converter are typically turned off 2510. A microphone and its related blocks are typically only turned on 2520 during the active usage of a mobile device for an application requiring the use of a microphone such as voice call or video recording.

Figure 26:
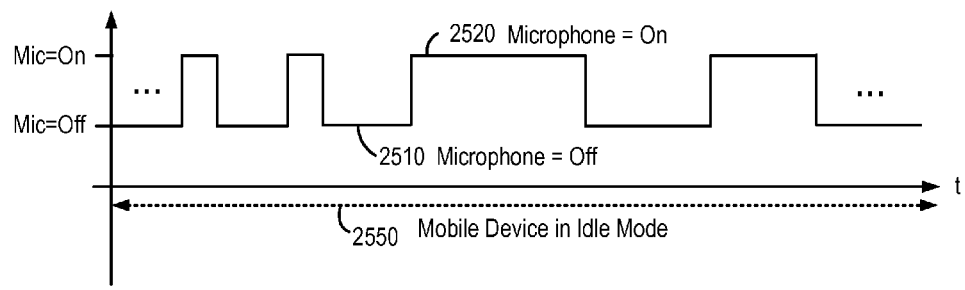
FIG. 26 is a diagram of a first embodiment of single microphone ON and OFF control.

FIG. 26 is a diagram of a first embodiment of single microphone ON and OFF control. In contrast to FIG. 25, a microphone may be configured to be selectively ON 2520 even during the period that a mobile device is in idle mode 2550. A microphone may be configured to be selectively ON according to the context information S600 of the Audio Input S270. In one embodiment, this feature may be desirable for the Passive Audio Monitoring State S1, the Active Audio Monitoring State S2, or the Audio Monitoring State S4.

Figure 27:
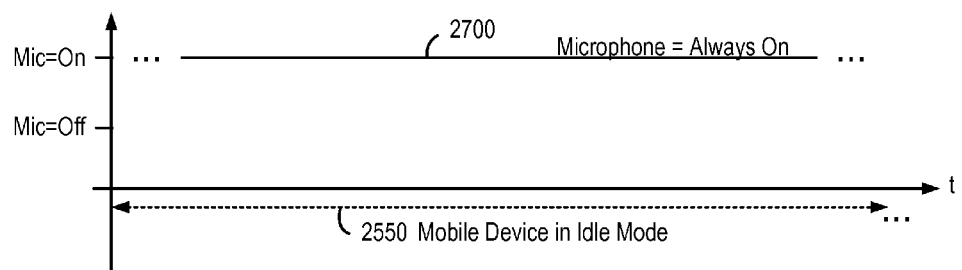
FIG. 27 is a diagram of a second embodiment of single microphone ON and OFF control.

FIG. 27 is a diagram of a second embodiment of single microphone ON and OFF control. In contrast to FIG. 26, a microphone may be configured to be consistently ON 2700 even during the period that a mobile device is in idle mode 2550. In such a case, power consumption of the system may be increased while a microphone is turned on. In one embodiment, this feature may be applicable to the Passive Audio Monitoring State S1, the Active Audio Monitoring State S2, the Audio Monitoring State S4, or the Active Audio Logging State S3 S5.

Figure 28:
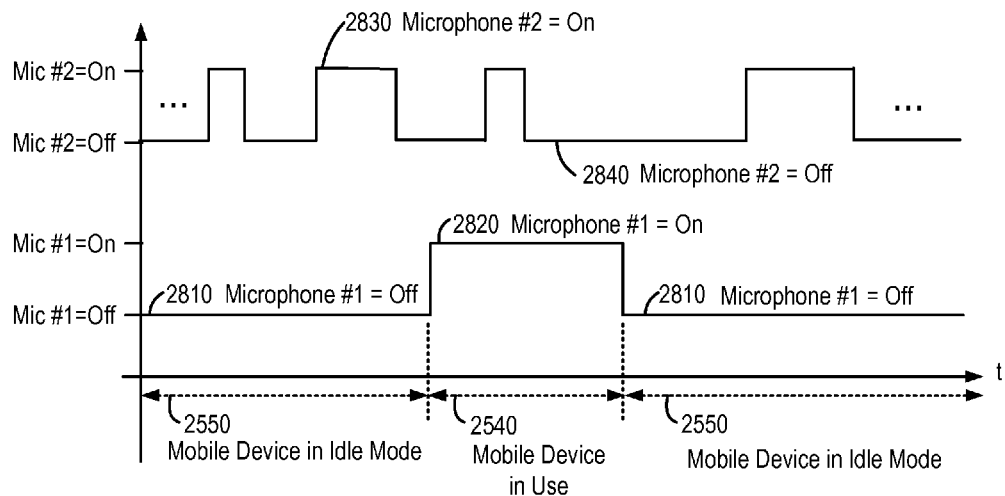
FIG. 28 is a diagram of a first embodiment of multiple microphones ON and OFF control.

FIG. 28 is a diagram of a first embodiment of multiple microphones ON and OFF control. In one embodiment, one or more microphones may be configured to operate in a similar way to the conventional system. In other words, one or more microphones may only be turned on during active voice call or during video recording or any other applications requiring active usage of one or more microphones in response to user's manual selection. However, the other microphones may be configured to be ON intermittently. Only two microphones are presented in the figure for exemplary purpose but the same concept of microphone control may be applied to more than two microphones.

Figure 29:
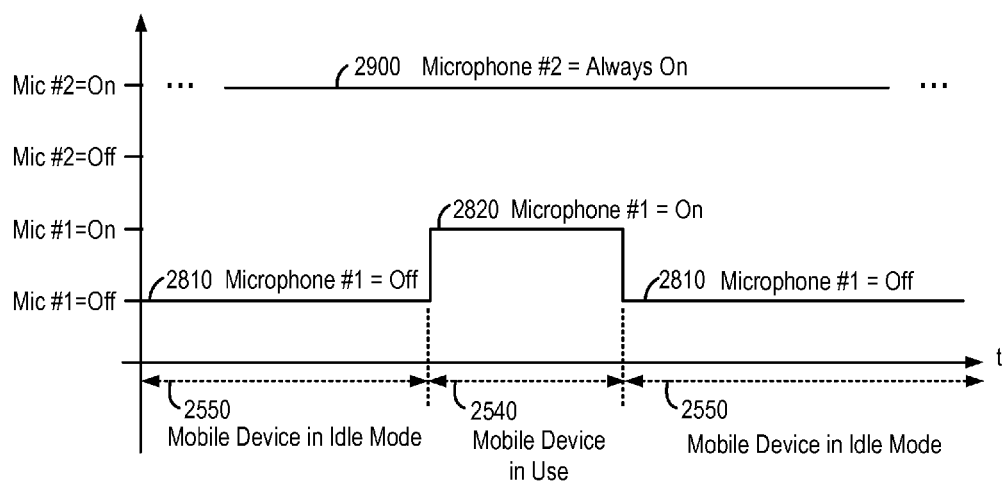
FIG. 29 is a diagram of a second embodiment of multiple microphones ON and OFF control.

FIG. 29 is a diagram of a second embodiment of multiple microphones ON and OFF control. In contrast to FIG. 28, one or more microphones may be configured to operate in a similar way to the conventional system in such a way that one or more microphones may only be turned on during active voice call or during video recording or any other applications requiring active usage of one or more microphones in response to user's manual selection. However, the other microphones may be configured to be ON constantly. In such a case, power consumption of the system may be increased while a microphone is turned on. Only two microphones are presented in the figure for exemplary purpose but the same concept of microphone control may be applied to more than two microphones.

Figure 30:
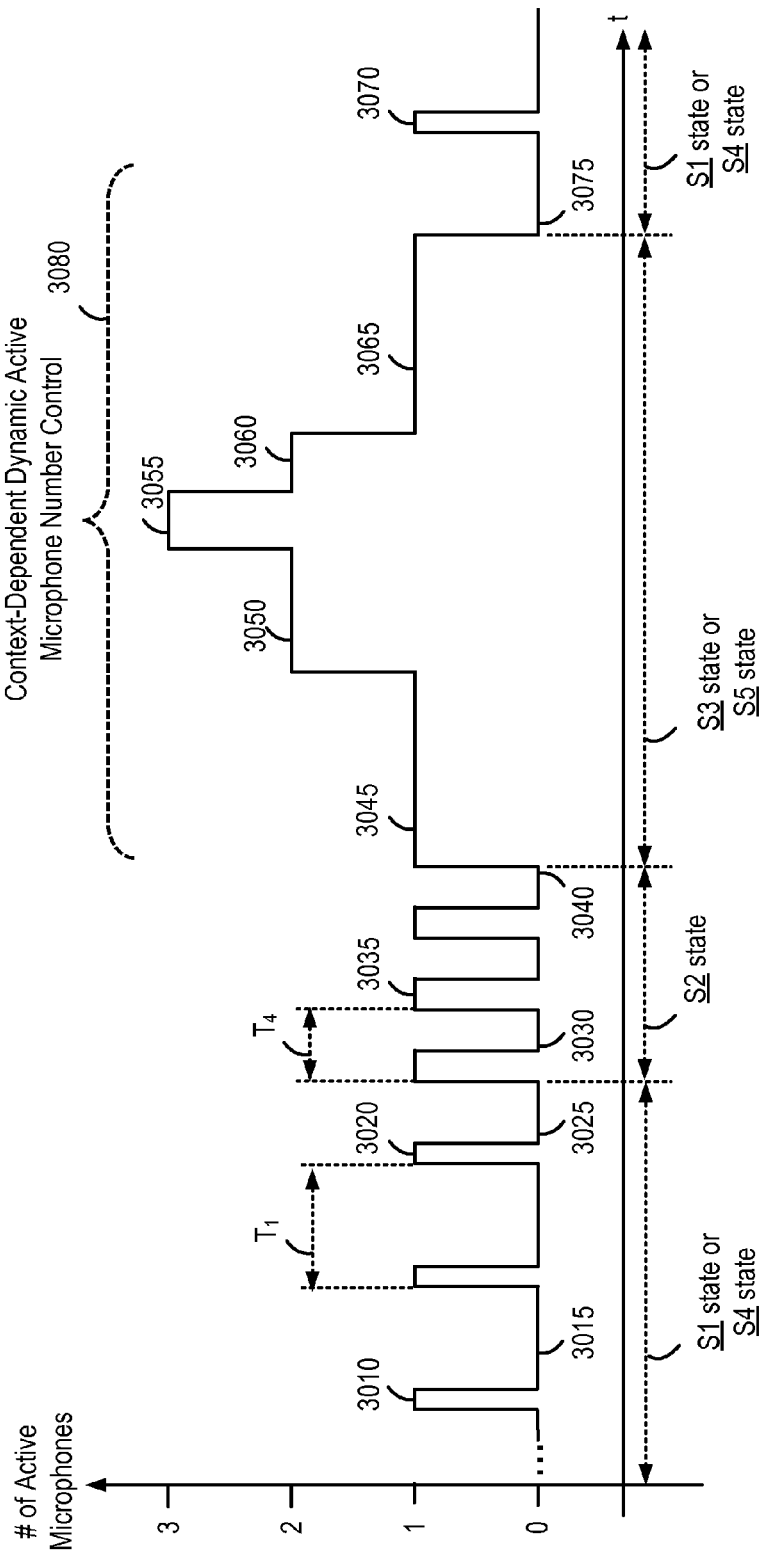
FIG. 30 is a diagram of an embodiment of active microphone number control.

FIG. 30 is a diagram of an embodiment of active microphone number control according to the present application in which active number of microphone can be dynamically controlled according to context information S600. For exemplary purposes, the maximum number of available microphones is assumed as three and is also the maximum number of microphone that can be turned on during the Passive Audio Monitoring State S1, the Active Audio Monitoring State S2, or the Audio Monitoring State S4. However, the selection of different number of microphones may still be within the scope of the present disclosure. During the Passive Audio Monitoring State S1 or the Audio Monitoring State S4 states, a microphone may be configured to be turned on periodically so it can monitor auditory event of environment. Therefore during these states, the active number of microphone may change preferably between zero and one. During the Active Audio Monitoring State S2 state, the active number of microphones may continue to change preferably between zero and one but the interval between ON period, $T_4$, may be configured to be larger than that of the Passive Audio Monitoring State S1 or the Audio Monitoring State S4 states, $T_1$.

During the Active Audio Logging State S3 S5, the number active microphones may be configured to change dynamically according to the context information S600. For example, the active number of microphone may be configured to increase from one 3045 to two 3050 upon detection of specific context information S600 or high priority context information S600. In another example, the microphone number may be configured to increase when the characteristics of background noise change from stationary to non-stationary or from mild-level to severe-level. In such a case, a multi-microphone-based noise suppression method may be able to increase the quality of the Audio Input S270. The increase or decrease of the number of active microphones may also be based on the quality of the Audio Input S270. The number of microphones may increase with the quality of the Audio Input S270, for example according to the signal-to-ratio (SNR) of the Audio Input S270, degrades below a certain threshold.

Figure 31:
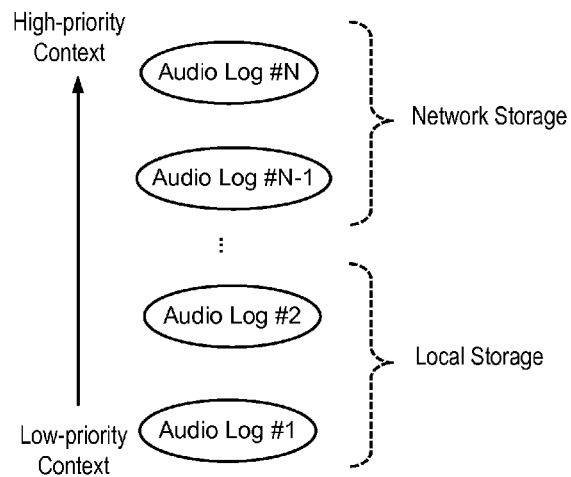
FIG. 31 is a diagram of an embodiment of storage location selection in which the selection may be controlled according to pre-defined context information S600 priority.

The storage of audio logging may be configured to be changed dynamically between local storage and remote storage during the actual audio logging process or after the completion of audio logging. For example, FIG. 31 shows an embodiment of storage location selection in which the selection may be controlled according to pre-defined context information S600 priority. This selection may be performed before the start of audio logging or after the completion of audio logging. For example, the context information S600 may be pre-configured to have a different level of priority. Then, before the start of each audio logging, the storage may be selected according to the comparison between the characteristics of the context information S600 during some period of window and pre-defined one or more thresholds. In another embodiment, the selection of long-term storage may be decided after the completion of each audio logging. The initial audio logging may be stored by default for example within local storage for short-term storage purposes. Upon the completion of an audio logging, the audio logging may be analyzed by the Audio Logging Processor 230 in order to determine the long-term storage location for the audio logging. Each audio logging may be assigned a priority before or after the completion of the audio logging. The long-term storage selection may be configured to be based on the priority of the audio logging. FIG. 31 shows an exemplary system in which the audio logging with lower-priority context information is stored in local storage whereas the audio logging with higher-priority context information is stored in network storage. It should be noted that the audio logging with lower-priority context information may be stored in network storage or the audio logging with higher-priority context information may be stored in local storage within the scope of the present disclosure.

Figure 32:
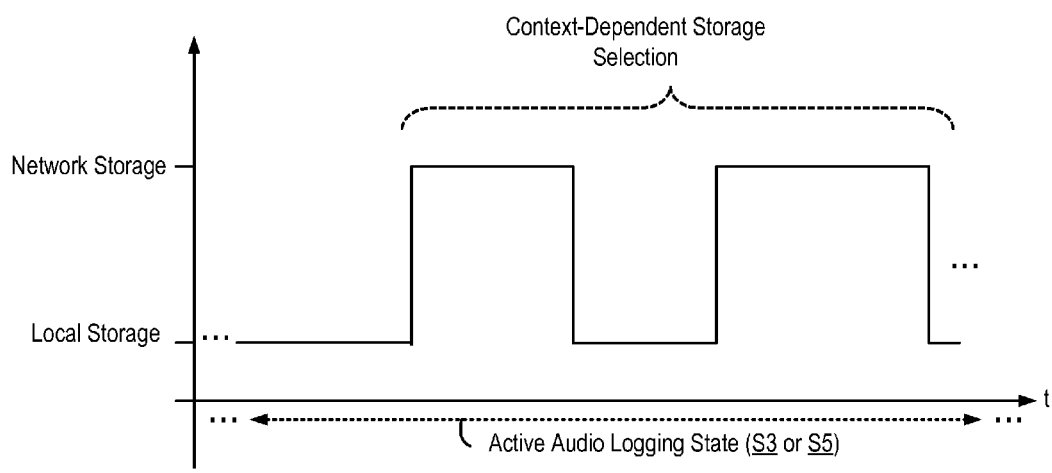
FIG. 32 is a diagram of an embodiment of storage location selection in which the selection may be dynamically controlled according to context information S600 priority during the Active Audio Logging State S3 or S5.

FIG. 32 shows an embodiment of storage location selection in which the selection may be dynamically controlled according to context information S600 priority during the Active Audio Logging State S3, S5. In contrast to FIG. 31, storage selection may be dynamically switched during the actual audio logging processing according to the context information S600, the available memory space or the quality of channel between a mobile device and remote server.

Figure 33:
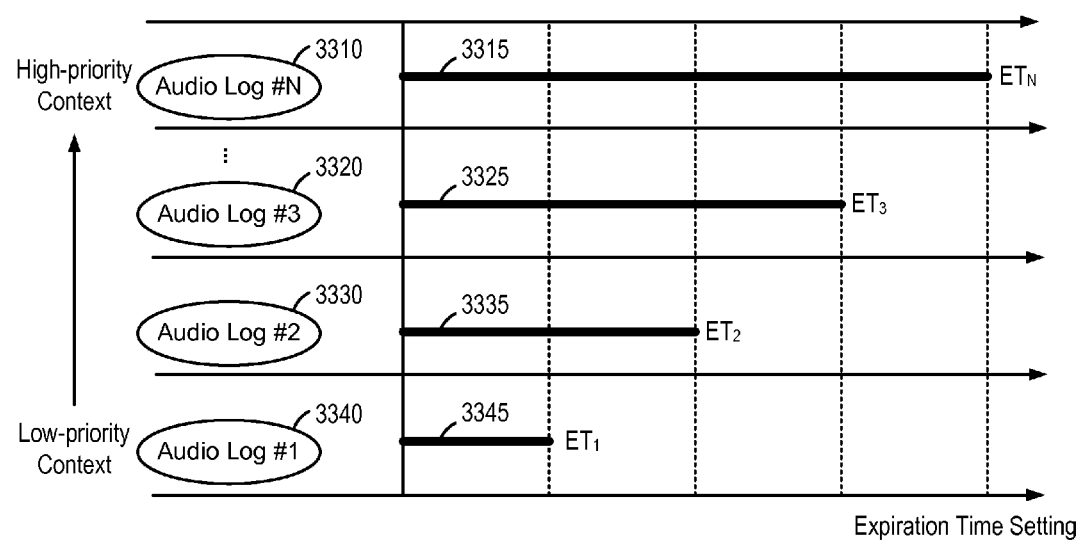
FIG. 33 is a diagram of an embodiment of a storage expiration time setting in which the expiration time may be controlled according to pre-defined context information S600 priority.

FIG. 33 is a diagram of an embodiment of storage expiration time setting in which the expiration time may be controlled according to pre-defined context information S600 priority. Audio logging stored in storages may be configured to be deleted by user's manual selection or expired automatically by a mechanism that may be based on the pre-defined expiration time. When an audio logging expired, the expired audio logging may be configured to be deleted or moved to temporary storage place such as "Recycled Bin." The expired audio logging may be configured to be compressed if it were not compressed at the time of recording. In case it was already encoded at the time of recording, it may be transcoded using a coding format or coding parameters that could allow higher compression resulting in more compact audio logging size.

Expiration time setting may be determined at the time of audio logging or after completion of audio. In one embodiment, each audio logging may be assigned a priority value according to the characteristics or statistics of context information S600 of the audio logging. For instance, the audio logging #1 3340 in FIG. 33 may have lower priority than the audio logging #3 3320. In an exemplary implementation, it may be desirable to set the expiration time of the audio logging #1, $ET_1$, smaller than the expiration time of the audio logging #3, $ET_3$. As an example, $ET_1$ may be set "1 week" and $ET_3$ may be set "2 weeks." It is generally desirable to have an expiration time for an audio logging in proportion to the priority of the audio logging. But it should be noted that audio logging having a different priority doesn't necessarily have to have a different expiration time setting always.

Figure 34:
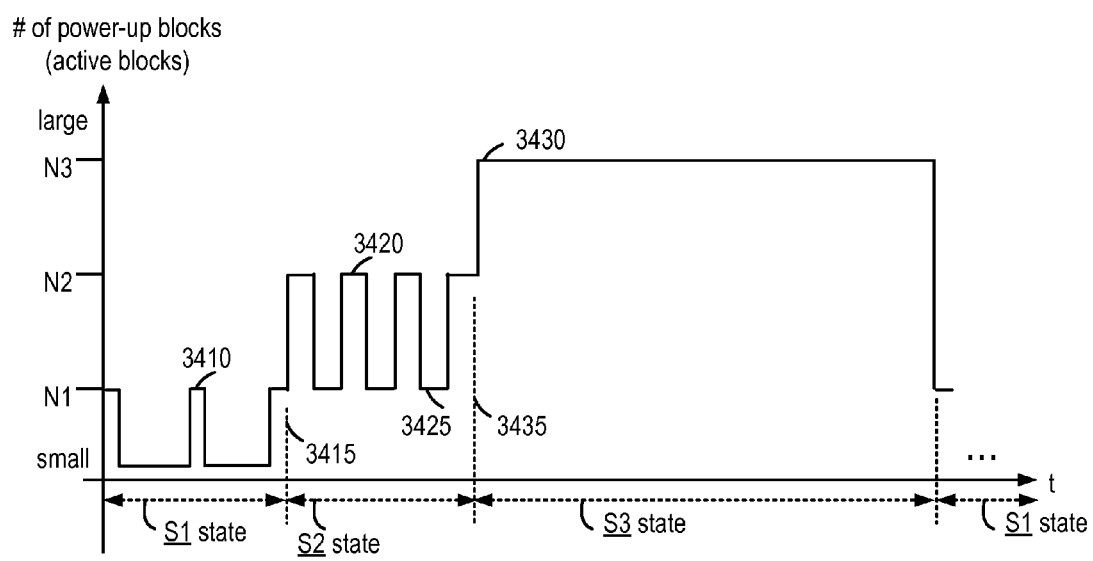
FIG. 34 is a diagram of an embodiment of stage-by-stage power up of blocks within the smart audio logging system in which number of active blocks and total power consumption thereof may be controlled dynamically according to each state.

FIG. 34 is a diagram of an embodiment of stage-by-stage power up of blocks within the smart audio logging system in which number of active blocks and total power consumption thereof may be controlled dynamically according to each state. During the Passive Audio Monitoring State S1, one or more number of microphones may be configured to wake up periodically in order to receive the Audio Input S270. In order to perform this receiving operation, the system may be configured to wake up a portion of system and thereby the number of active blocks, or interchangeably the number of power-up blocks, of the system increased to N1 in FIG. 34. During the Active Audio Monitoring State S2, one or more additional blocks may be configured to wake up in addition to N1, which makes the total number of active blocks as N2 during the periods that one or more microphones are active 3420. For instance, the Context Identifier 560 and the Context Evaluation Logic 950 may be configured to wake up as it was exemplified in FIG. 9B. During the Active Audio Logging State S3, it is likely that at least some more blocks may need to wake up in addition to N2, which in turn makes the total number of active blocks during the Active Audio Logging State S3 state as N3. The baseline number of active blocks 3425 during the Active Audio Monitoring State S2 state is set as N1 in FIG. 34, which happens to be the same of the number of active blocks during the Passive Audio Monitoring State S1 state but it should be obvious for those skilled in the art that this may be configured to be different in another embodiment within the scope of the present disclosure. The number of active blocks for the Audio Monitoring State S4 or the Active Audio Logging State S5 may be implemented similar to the Passive Audio Monitoring State S1 or the Active Audio Logging State S3, respectively.

Figure 35:
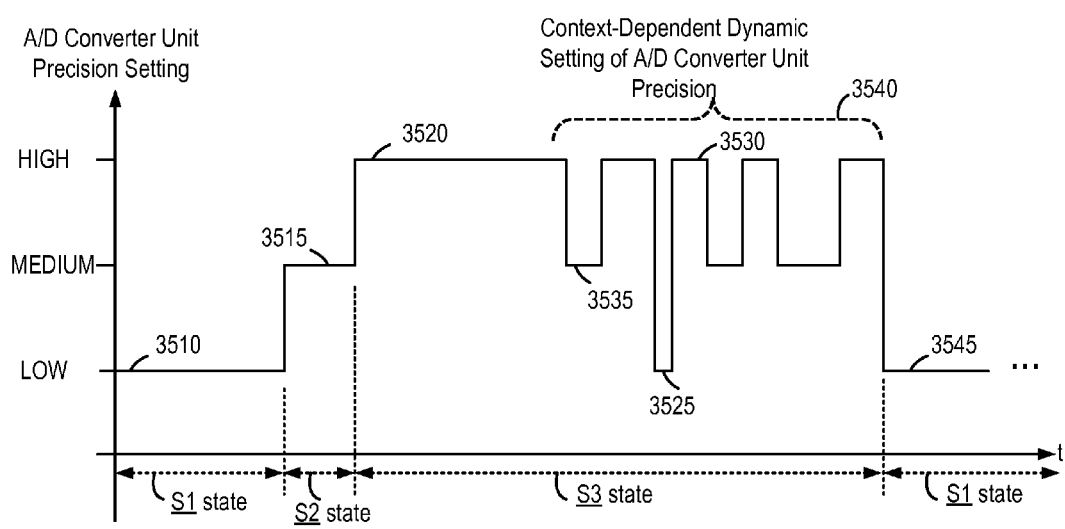
FIG. 35 is a diagram of an embodiment of A/D converter precision control in which the precision may be configured pertaining to each pre-determined state or dynamically controlled according to context information S600.

FIG. 35 is a diagram of an embodiment of A/D converter precision control in which the precision may be configured according to each pre-determined state or dynamically controlled pertaining to context information S600. A/D converter unit during the Passive Audio Monitoring State S1 state may be configured to have a low-resolution setting, labeled as "LOW" in FIG. 35, while it may be configured to have a mid-resolution setting, "MEDIUM" setting, or higher-resolution setting, "HIGH" setting, for the Active Audio Monitoring State S2 or the Active Audio Logging State S3 states, respectively. This mechanism may help to save power consumption or memory usage by allowing optimized settings for each state. In another embodiment, the A/D converter setting during the Passive Audio Monitoring State S1 and the Active Audio Monitoring State S2 stages may be configured to have the same resolution. Alternatively, A/D converter setting during the Active Audio Monitoring State S2 and the Active Audio Logging State S3 stage may be configured to have the same resolution.

The precision setting for A/D converter unit may be configured to be changed dynamically during the Active Audio Logging State S3 based on the context information S600. FIG. 35 shows that the dynamic change may be configured to be in effect for either entire or partial duration 3540 during active audio logging process. It is assumed that the default precision setting for the Active Audio Logging State S3 is "High" 3520. When there is a significant change in terms of the priority of the context information S600, the precision setting may be lowed to "Medium" 3535 or "Low" settings 3525. For instance, the change of precision setting may be initiated by the change of the content classification, which is subset of the context information S600, from "Music" to "Speech" or "Speech" to "Music." Alternatively, it may be initiated by the change of background noise level or noise type of the Audio Input S270. In another embodiment, it may be initiated by the available memory size in local storage or the quality of channel between a mobile device and remote server.

Figure 36:
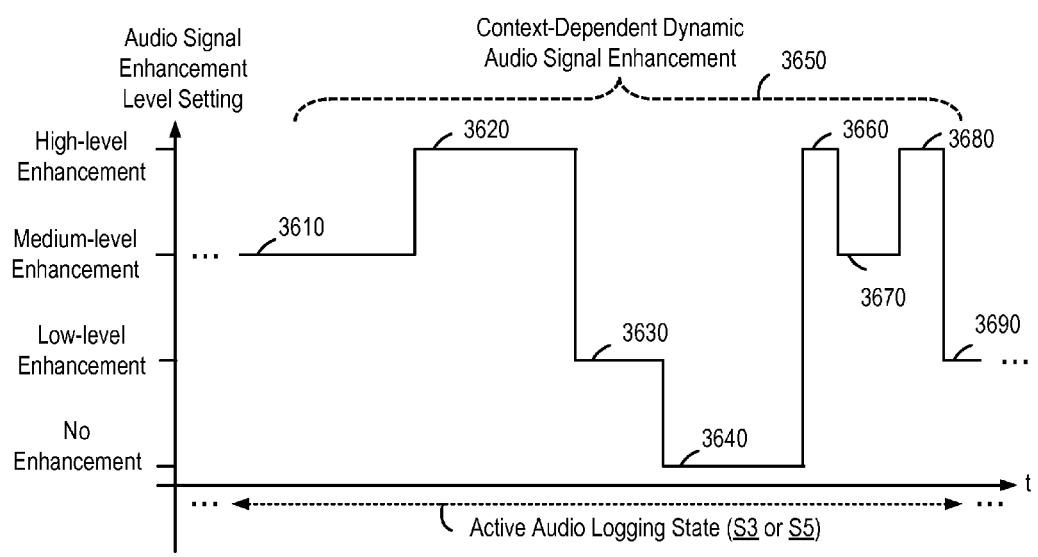
FIG. 36 is a diagram of an embodiment of audio input signal enhancement control in which the enhancement may be dynamically configured according to context information S600.

FIG. 36 is a diagram of an embodiment of audio input signal enhancement control in which the enhancement may be dynamically configured according to context information S600. For exemplary purpose, it was assumed that there are several signal enhancement levels—no enhancement, low-level, medium-level, and high-level enhancements. During the Active Audio Logging State S3, S5, audio signal enhancement level may be configured to be dynamically adjusted according to the context information S600. For instance, the characteristics or the level of background noise may be used to trigger the change of audio signal enhancement level. When the background noise level is significantly higher or the characteristics of the background noise level is substantially changed from stationary type noise to non-stationary type noise, the audio signal enhancement setting may be configured to be changed from low-level enhancement or no enhancement to medium-level enhancement or even high-level enhancement. For example, a user may be inside the subway station waiting for his or her train to arrive when the smart audio logging system might be in the Audio Logging State S3, S5, actively logging the Audio Input S270. When train is arriving or leaving at platform, the noise level often times exceeded a certain threshold beyond which normal conversational speech is hard to understand. Upon detection of the significant background noise level or type change or upon detection of the major auditory scene change, the smart audio logging system may reconfigure audio signal enhancement settings accordingly. The audio signal enhancement setting change may be followed by or preceded by the active number of microphone.

Figure 37:
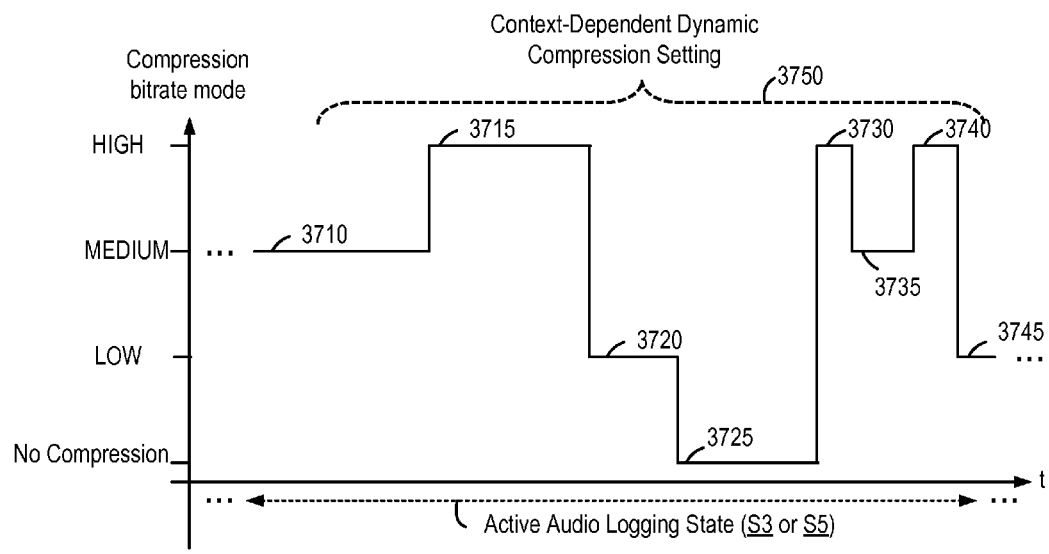
FIG. 37 is a diagram of an embodiment of audio compression parameters control in which the compression may be dynamically configured according to context information S600.

FIG. 37 is a diagram of an embodiment of audio compression parameters control in which the compression may be dynamically configured according to context information S600. For exemplary purpose, it was assumed that there are several compression levels-no compression, "Low," "Medium," and "High" compressions. During the Active Audio Logging State S3, S5, the audio signal compression level may be configured to be dynamically adjusted according to the context information S600. For instance, the change of compression mode may be initiated by the change of the content classification, which is subset of the context information S600, from "Music" to "Speech" or "Speech" to "Music." It may be desirable to use a higher bitrate for "Music" content whereas it may be desirable to use a lower bitrate for "Speech" content in which the bandwidth of the signal to be encoded is typically much narrower than typical "Music" content. Alternatively, it may be initiated by the available memory size in local storage or the quality of channel between a mobile device and remote server.

Figure 38:
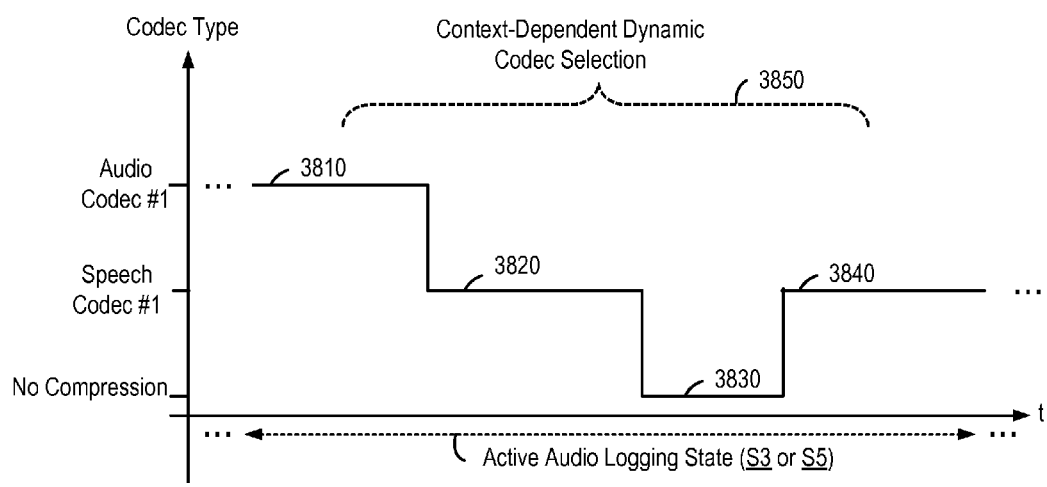
FIG. 38 is a diagram of an embodiment of compression coding format selection in which the compression coding format selection or lack thereof may be dynamically configured according to context information S600.

The coding format may be configured to be changed as well according to the context information S600. FIG. 38 is a diagram of an embodiment of compression coding format selection in which the compression coding format selection or lack thereof may be dynamically configured according to context information S600. For exemplary purposes, the audio codec #1 and the speech codec #1 were shown in FIG. 38 but generally the coding format may also be configured to change between audio codecs or between speech codecs.

For instance, the present audio codec #1 3810 may be configured to be changed to the speech codec #1 3820. Upon detection of the major signal classification change from "Music" to "Speech." In another embodiment, the coding format change, if at all, may be triggered only after "no compression mode" 3830 or alternatively it may be triggered anytime upon detection of the pre-defined context information S600 change without "no compression mode" 3830 in between.

Various exemplary configurations are provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. For example, it is emphasized that the scope of this disclosure is not limited to the illustrated configurations. Rather, it is expressly contemplated and hereby disclosed that features of the different particular configurations as described herein may be combined to produce other configurations that are included within the scope of this disclosure, for any case in which such features are not inconsistent with one another. It is also expressly contemplated and hereby disclosed that where a connection is described between two or more elements of an apparatus, one or more intervening elements (such as a filter) may exist, and that where a connection is described between two or more tasks of a method, one or more intervening tasks or operations (such as a filtering operation) may exist.

The configurations described herein may be implemented in part or in whole as a hard-wired circuit, as a circuit configuration fabricated into an application-specific integrated circuit, or as a firmware program loaded into non-volatile storage or a software program loaded from or into a computer-readable medium as machine-readable code, such code being instructions executable by an array of logic elements such as a microprocessor or other digital signal processing unit. The computer-readable medium may be an array of storage elements such as semiconductor memory (which may include without limitation dynamic or static RAM (random-access memory), ROM (read-only memory), and/or flash RAM), or ferroelectric, polymeric, or phase-change memory; a disk medium such as a magnetic or optical disk; or any other computer-readable medium for data storage. The term "software" should be understood to include source code, assembly language code, machine code, binary code, firmware, macrocode, microcode, any one or more sets or sequences of instructions executable by an array of logic elements, and any combination of such examples.

Each of the methods disclosed herein may also be tangibly embodied (for example, in one or more computer-readable media as listed above) as one or more sets of instructions readable and/or executable by a machine including an array of logic elements (e.g., a processor, microprocessor, microcontroller, or other finite state machine). Thus, the present disclosure is not intended to be limited to the configurations shown above but rather is to be accorded the widest scope consistent with the principles and novel features disclosed in any fashion herein, including in the attached claims as filed, which form a part of the original disclosure.

What is claimed is:

1. A method of processing a digital audio signal for a mobile device, the method comprising:
    receiving an acoustic signal by at least one microphone;
    converting the received acoustic signal into the digital audio signal;
    extracting auditory context information from the digital audio signal;
    in response to automatically detecting a start event indicator, performing an audio logging for the digital audio signal; and
    in response to automatically detecting an end event indicator, ending the audio logging,
    wherein the detecting the start event indicator comprises:
        selecting at least one context information from the auditory context information; and
        in response to comparing the selected context information with a threshold, determining if the start event indicator has been detected, and
    wherein the auditory context information relates to at least one of followings—audio classification, keyword identification, or speaker identification, and
    wherein the auditory context information is based at least in part on non-auditory information.

2. The method of processing a digital audio signal according to claim 1, wherein the converting comprises:
    transforming the received acoustic signal into an electrical signal;
    sampling the electrical signal to obtain the digital audio signal; and
    storing the digital audio signal into a buffer,
    wherein the sampling is based on a sampling frequency and a data width.

3. The method of processing a digital audio signal according to claim 1, wherein the auditory context information is based at least in part on one of followings—signal-to-noise ratio, spectral tilt, or zero-crossing rate.

4. The method of processing a digital audio signal according to claim 1, wherein the non-auditory information comprises scheduling or calendaring information.

5. The method of processing a digital audio signal according to claim 1, wherein the detecting the start event indicator is based at least in part on non-auditory information, and wherein the non-auditory information comprises scheduling or calendaring information.

6. The method of processing a digital audio signal according to claim 1, wherein the performing the audio logging comprises:
    updating at least one parameter related with the converting based at least in part on the auditory context information;
    in response to determining if an additional processing is required based at least in part on the auditory context information, applying the additional processing to the digital audio signal to obtain a processed audio signal; and
    storing the processed audio signal into a memory storage.

7. The method of processing a digital audio signal according to claim 6, wherein the additional processing includes signal enhancement processing.

8. The method of processing a digital audio signal according to claim 7, wherein the signal enhancement processing includes at least one of followings—acoustic echo cancellation (AEC), receiving voice enhancement (RVE), active noise cancellation (ANC), noise suppression (NS), acoustic gain control (AGC), acoustic volume control (AVC), or acoustic dynamic range control (ADRC).

9. The method of processing a digital audio signal according to claim 8, wherein the noise suppression is based on a plurality of microphones.

10. The method of processing a digital audio signal according to claim 6, wherein the additional processing includes signal compression processing.

11. The method of processing a digital audio signal according to claim 10, wherein the signal compression processing includes speech compression or audio compression.

12. The method of processing a digital audio signal according to claim 10, wherein at least one compression parameter is determined based on the auditory context information.

13. The method of processing a digital audio signal according to claim 12, wherein said at least one compression parameter includes compression mode, bitrate, or channel number.

14. The method of processing a digital audio signal according to claim 6, wherein the memory storage comprises a local memory inside the mobile device or a remote memory connected to the mobile device through a wireless channel.

15. The method of processing a digital audio signal according to claim 14, wherein the memory storage is selected based at least in part on the auditory context information.

16. The method of processing a digital audio signal according to claim 1, wherein the detecting the end event indicator comprises:
    selecting at least one context information from the auditory context information; and
    in response to comparing the selected context information with a threshold, determining if the end event indicator has been detected.

17. The method of processing a digital audio signal according to claim 1, wherein the detecting the end event indicator is based at least in part on non-occurrence of auditory event during pre-determined period of time.

18. The method of processing a digital audio signal according to claim 1, wherein the detecting the end event indicator is based at least in part on non-auditory information, and wherein the non-auditory information comprises scheduling or calendaring information.

19. An apparatus for processing a digital audio signal for a mobile device, the apparatus comprising:
- at least one microphone configured to receive an acoustic signal;
- a converter configured to convert the received acoustic signal into the digital audio signal;
- a context identifier configured to extract auditory context information from the digital audio signal;
- a start event manager configured to automatically detect a start event indicator;
- an end event manager configured to automatically detect an end event indicator; and
- an audio logging processor configured to:
  - perform an audio logging for the digital audio signal in response to the detecting of the start event indicator; and
  - end the audio logging in response to the detecting of the end event indicator,
- wherein the start event manager is configured to:
  - select at least one context information from the auditory context information;
  - compare the selected context information with a threshold; and
  - determine if the start event indicator has been detected in response to the comparing, and
- wherein the auditory context information relates to at least one of followings—audio classification, keyword identification, or speaker identification, and
- wherein the auditory context information is based at least in part on non-auditory information.

20. The apparatus for processing a digital audio signal according to claim 19, wherein the converter configured to:
- transform the received acoustic signal into an electrical signal;
- sample the electrical signal to obtain the digital audio signal; and
- store the digital audio signal into a buffer,
- wherein the sampling is based on a sampling frequency and a data width.

21. The apparatus for processing a digital audio signal according to claim 19, wherein the auditory context information is based at least in part on one of followings—signal-to-noise ratio, spectral tilt, or zero-crossing rate.

22. The apparatus for processing a digital audio signal according to claim 19, wherein the non-auditory information comprises scheduling or calendaring information.

23. The apparatus for processing a digital audio signal according to claim 19, wherein the detecting the start event indicator is based at least in part on non-auditory information, and wherein the non-auditory information comprises scheduling or calendaring information.

24. The apparatus for processing a digital audio signal according to claim 19, wherein the audio logging processor is configured to:
- update at least one parameter related with the converter based at least in part on the auditory context information;
- determine if an additional processing is required based at least in part on the auditory context information;
- apply the additional processing to the digital audio signal to obtain a processed audio signal, in response to the determining; and
- store the processed audio signal into a memory storage.

25. The apparatus for processing a digital audio signal according to claim 24, wherein the additional processing includes signal enhancement processing.

26. The apparatus for processing a digital audio signal according to claim 25, wherein the signal enhancement processing includes at least one of followings—acoustic echo cancellation (AEC), receiving voice enhancement (RVE), active noise cancellation (ANC), noise suppression (NS), acoustic gain control (AGC), acoustic volume control (AVC), or acoustic dynamic range control (ADRC).

27. The apparatus for processing a digital audio signal according to claim 26, wherein the noise suppression is based on a plurality of microphones.

28. The apparatus for processing a digital audio signal according to claim 24, wherein the additional processing includes signal compression processing.

29. The apparatus for processing a digital audio signal according to claim 28, wherein the signal compression processing includes speech compression or audio compression.

30. The apparatus for processing a digital audio signal according to claim 28, wherein at least one compression parameter is determined based on the auditory context information.

31. The apparatus for processing a digital audio signal according to claim 30, wherein said at least one compression parameter includes compression mode, bitrate, or channel number.

32. The apparatus for processing a digital audio signal according to claim 24, wherein the memory storage comprises a local memory inside the mobile device or a remote memory connected to the mobile device through a wireless channel.

33. The apparatus for processing a digital audio signal according to claim 32, wherein the memory storage is selected based at least in part on the auditory context information.

34. The apparatus for processing a digital audio signal according to claim 19, wherein the end event manager is configured to:
- select at least one context information from the auditory context information;
- compare the selected context information with a threshold; and
- determine if the end event indicator has been detected in response to the comparing.

35. The apparatus for processing a digital audio signal according to claim 19, wherein the detecting the end event indicator is based at least in part on non-occurrence of auditory event during pre-determined period of time.

36. The apparatus for processing a digital audio signal according to claim 19, wherein the detecting the end event indicator is based at least in part on non-auditory information, and wherein the non-auditory information comprises scheduling or calendaring information.

37. An apparatus for processing a digital audio signal for a mobile device, the apparatus comprising:
- means for receiving an acoustic signal by at least one microphone;
- means for converting the received acoustic signal into the digital audio signal;
- means for extracting auditory context information from the digital audio signal;
- means for automatically detecting a start event indicator;
- means for performing an audio logging for the digital audio signal in response to the detecting the start event indicator;

means for automatically detecting an end event indicator; and
means for ending an audio logging for the digital audio signal in response to the detecting the end event indicator,
wherein the means for automatically detecting the start event indicator comprises:
 means for selecting at least one context information from the auditory context information;
 means for comparing the selected context information with a threshold; and
 means for determining if the start event indicator has been detected in response to the comparing, and
wherein the auditory context information relates to at least one of followings—audio classification, keyword identification, or speaker identification, and
wherein the auditory context information is based at least in part on non-auditory information.

38. The apparatus for processing a digital audio signal according to claim 37, wherein the means for converting comprises:
 means for transforming the received acoustic signal into an electrical signal;
 means for sampling the electrical signal to obtain the digital audio signal; and
 means for storing the digital audio signal into a buffer,
 wherein the sampling is based on a sampling frequency and a data width.

39. The apparatus for processing a digital audio signal according to claim 37, wherein the auditory context information is based at least in part on one of followings—signal-to-noise ratio, spectral tilt, or zero-crossing rate.

40. The apparatus for processing a digital audio signal according to claim 37, wherein the non-auditory information comprises scheduling or calendaring information.

41. The apparatus for processing a digital audio signal according to claim 37, wherein the detecting the start event indicator is based at least in part on non-auditory information, and wherein the non-auditory information comprises scheduling or calendaring information.

42. The apparatus for processing a digital audio signal according to claim 37, wherein the means for performing the audio logging comprises:
 means for updating at least one parameter related with the means for converting based at least in part on the auditory context information;
 means for determining if an additional processing is required based at least in part on the auditory context information;
 means for applying the additional processing to the digital audio signal to obtain a processed audio signal, in response to the determining; and
 means for storing the processed audio signal into a memory storage.

43. The apparatus for processing a digital audio signal according to claim 42, wherein the additional processing includes signal enhancement processing.

44. The apparatus for processing a digital audio signal according to claim 43, wherein the signal enhancement processing includes at least one of followings—acoustic echo cancellation (AEC), receiving voice enhancement (RVE), active noise cancellation (ANC), noise suppression (NS), acoustic gain control (AGC), acoustic volume control (AVC), or acoustic dynamic range control (ADRC).

45. The apparatus for processing a digital audio signal according to claim 44, wherein the noise suppression is based on a plurality of microphones.

46. The apparatus for processing a digital audio signal according to claim 42, wherein the additional processing includes signal compression processing.

47. The apparatus for processing a digital audio signal according to claim 46, wherein the signal compression processing includes speech compression or audio compression.

48. The apparatus for processing a digital audio signal according to claim 46, wherein at least one compression parameter is determined based on the auditory context information.

49. The apparatus for processing a digital audio signal according to claim 48, wherein said at least one compression parameter includes compression mode, bitrate, or channel number.

50. The apparatus for processing a digital audio signal according to claim 42, wherein the memory storage comprises a local memory inside the mobile device or a remote memory connected to the mobile device through a wireless channel.

51. The apparatus for processing a digital audio signal according to claim 50, wherein the memory storage is selected based at least in part on the auditory context information.

52. The apparatus for processing a digital audio signal according to claim 37, wherein the means for detecting the end event indicator comprises:
 means for selecting at least one context information from the auditory context information;
 means for comparing the selected context information with a threshold; and
 means for determining if the end event indicator has been detected in response to the comparing.

53. The apparatus for processing a digital audio signal according to claim 37, wherein the means for detecting the end event indicator is based at least in part on non-occurrence of auditory event during pre-determined period of time.

54. The apparatus for processing a digital audio signal according to claim 37, wherein the means for detecting the end event indicator is based at least in part on non-auditory information, and wherein the non-auditory information comprises scheduling or calendaring information.

55. A non-transitory computer-readable medium comprising instructions for processing a digital audio signal for a mobile device, which when executed by a processor cause the processor to:
 receive an acoustic signal by at least one microphone;
 convert the received acoustic signal into the digital audio signal;
 extract auditory context information from the digital audio signal;
 automatically detect a start event indicator;
 perform an audio logging for the digital audio signal in response to the detecting the start event indicator;
 automatically detect an end event indicator; and
 end the audio logging in response to the detecting the end event indicator,
wherein the instructions which when executed by a processor cause the processor to detect the start event indicator are configured to cause the processor to:
 select at least one context information from the auditory context information;
 compare the selected context information with a threshold; and
 determine if the start event indicator has been detected in response to the comparing, and wherein the auditory context information relates to at least one of followings—audio classification, keyword identification, or speaker identification, and wherein the auditory context information is based at least in part on non-auditory information.

56. The computer-readable medium according to claim 55, wherein the instructions which when executed by a processor cause the processor to convert the received acoustic signal are configured to cause the processor to:

transform the received acoustic signal into an electrical signal;

sample the electrical signal to obtain the digital audio signal; and store the digital audio signal into a buffer, wherein the sampling is based on a sampling frequency and a data width.

57. The computer-readable medium according to claim 55, wherein the auditory context information is based at least in part on one of followings—signal-to-noise ratio, spectral tilt, or zero-crossing rate.

58. The computer-readable medium according to claim 55, wherein the non-auditory information comprises scheduling or calendaring information.

59. The computer-readable medium according to claim 55, wherein the instructions which when executed by a processor cause the processor to detect the start event indicator are configured to detect the start event indicator based at least in part on non-auditory information, and wherein the non-auditory information comprises scheduling or calendaring information.

60. The computer-readable medium according to claim 55, wherein the instructions which when executed by a processor cause the processor to perform the audio logging are configured to cause the processor to:

update at least one parameter related with the converting based at least in part on the auditory context information;

determine if an additional processing is required based at least in part on the auditory context information;

apply the additional processing to the digital audio signal to obtain a processed audio signal, in response to the determining; and store the processed audio signal into a memory storage.

61. The computer-readable medium according to claim 60, wherein the additional processing includes signal enhancement processing.

62. The computer-readable medium according to claim 61, wherein the signal enhancement processing includes at least one of followings—acoustic echo cancellation (AEC), receiving voice enhancement (RVE), active noise cancellation (ANC), noise suppression (NS), acoustic gain control (AGC), acoustic volume control (AVC), or acoustic dynamic range control (ADRC).

63. The computer-readable medium according to claim 62, wherein the noise suppression is based on a plurality of microphones.

64. The computer-readable medium according to claim 60, wherein the additional processing includes signal compression processing.

65. The computer-readable medium according to claim 64, wherein the signal compression processing includes speech compression or audio compression.

66. The computer-readable medium according to claim 64, wherein at least one compression parameter is determined based on the auditory context information.

67. The computer-readable medium according to claim 66, wherein said at least one compression parameter includes compression mode, bitrate, or channel number.

68. The computer-readable medium according to claim 60, wherein the memory storage comprises a local memory inside the mobile device or a remote memory connected to the mobile device through a wireless channel.

69. The computer-readable medium according to claim 68, wherein the memory storage is selected based at least in part on the auditory context information.

70. The computer-readable medium according to claim 55, wherein the instructions which when executed by a processor cause the processor to detect the end event indicator are configured to cause the processor to:

select at least one context information from the auditory context information;

compare the selected context information with a threshold; and determine if the end event indicator has been detected in response to the comparing.

71. The computer-readable medium according to claim 55, wherein the instructions which when executed by a processor cause the processor to detect the end event indicator are configured to detect the end event indicator based at least in part on non-occurrence of auditory event during pre-determined period of time.

72. The computer-readable medium according to claim 55, wherein the instructions which when executed by a processor cause the processor to detect the end event indicator are configured to detect the end event indicator based at least in part on non-auditory information, and wherein the non-auditory information comprises scheduling or calendaring information.

73. The method of processing a digital audio signal according to claim 3, wherein said performing an audio logging for the digital audio signal comprises initiating an audio logging of the digital audio signal.

74. The method of processing a digital audio signal according to claim 73, wherein said ending the audio logging comprises terminating said initiated audio logging of the digital audio signal.

75. The method of processing a digital audio signal according to claim 3, wherein said method comprises, based on said auditory context information, selecting at least one among a compression mode, a bitrate, and a number of channels of the digital audio signal.

76. The method of processing a digital audio signal according to claim 3, wherein said method comprises, during said audio logging and based on said auditory context information, adjusting at least one among (A) a number of active microphones among said at least one microphone, (B) a sampling frequency of the digital audio signal, and (C) a data width of the digital audio signal.

77. The method of processing a digital audio signal according to claim 76, wherein said adjusting is performed during an inactive portion of the received acoustic signal.

78. The method of processing a digital audio signal according to claim 3, wherein said method is performed by said mobile device, and wherein during said receiving the acoustic signal, the mobile device is in an idle mode.

79. The method of processing a digital audio signal according to claim 3, wherein said method is performed by said mobile device, and wherein said mobile device is a mobile phone capable of engaging in voice calls, and wherein during said receiving the acoustic signal, the mobile device is not engaged in any voice call.

80. The method of processing a digital audio signal according to claim 79, wherein said mobile phone is capable of performing video recording, and
wherein during said receiving the acoustic signal, the mobile device is not performing video recording.

81. The method of processing a digital audio signal according to claim 79, wherein said method comprises periodically sending a signal to at least one base station during said receiving the acoustic signal.

82. The method of processing a digital audio signal according to claim 79, wherein said method comprises periodically receiving a signal from at least one base station during said receiving the acoustic signal.

83. The method of processing a digital audio signal according to claim 3, wherein said method is performed by said mobile device, and
wherein said mobile device is a mobile phone capable of engaging in voice calls, and
wherein during said converting the received acoustic signal, the mobile device is not engaged in any voice call.

84. The method of processing a digital audio signal according to claim 3, wherein said method is performed by said mobile device, and
wherein said mobile device is a mobile phone capable of engaging in voice calls, and
wherein during said extracting auditory context information, the mobile device is not engaged in any voice call.

85. The method of processing a digital audio signal according to claim 1, wherein said performing an audio logging for the digital audio signal comprises initiating an audio logging of the digital audio signal.

86. The method of processing a digital audio signal according to claim 85, wherein said ending the audio logging comprises terminating said initiated audio logging of the digital audio signal.

87. The method of processing a digital audio signal according to claim 1, wherein said method comprises, based on said auditory context information, selecting at least one among a compression mode, a bitrate, and a number of channels of the digital audio signal.

88. The method of processing a digital audio signal according to claim 1, wherein said method comprises, during said audio logging and based on said auditory context information, adjusting at least one among (A) a number of active microphones among said at least one microphone, (B) a sampling frequency of the digital audio signal, and (C) a data width of the digital audio signal.

89. The method of processing a digital audio signal according to claim 88, wherein said adjusting is performed during an inactive portion of the received acoustic signal.

90. The method of processing a digital audio signal according to claim 1, wherein said method is performed by said mobile device, and
wherein during said receiving the acoustic signal, the mobile device is in an idle mode.

91. The method of processing a digital audio signal according to claim 1, wherein said method is performed by said mobile device, and
wherein said mobile device is a mobile phone capable of engaging in voice calls, and
wherein during said receiving the acoustic signal, the mobile device is not engaged in any voice call.

92. The method of processing a digital audio signal according to claim 91, wherein said mobile phone is capable of performing video recording, and
wherein during said receiving the acoustic signal, the mobile device is not performing video recording.

93. The method of processing a digital audio signal according to claim 91, wherein said method comprises periodically sending a signal to at least one base station during said receiving the acoustic signal.

94. The method of processing a digital audio signal according to claim 91, wherein said method comprises periodically receiving a signal from at least one base station during said receiving the acoustic signal.

95. The method of processing a digital audio signal according to claim 1, wherein said method is performed by said mobile device, and
wherein said mobile device is a mobile phone capable of engaging in voice calls, and
wherein during said converting the received acoustic signal, the mobile device is not engaged in any voice call.

96. The method of processing a digital audio signal according to claim 1, wherein said method is performed by said mobile device, and
wherein said mobile device is a mobile phone capable of engaging in voice calls, and
wherein during said extracting auditory context information, the mobile device is not engaged in any voice call.

97. The method of processing a digital audio signal according to claim 16, wherein said performing an audio logging for the digital audio signal comprises initiating an audio logging of the digital audio signal.

98. The method of processing a digital audio signal according to claim 97, wherein said ending the audio logging comprises terminating said initiated audio logging of the digital audio signal.

99. The method of processing a digital audio signal according to claim 16, wherein said method comprises, based on said auditory context information, selecting at least one among a compression mode, a bitrate, and a number of channels of the digital audio signal.

100. The method of processing a digital audio signal according to claim 16, wherein said method comprises, during said audio logging and based on said auditory context information, adjusting at least one among (A) a number of active microphones among said at least one microphone, (B) a sampling frequency of the digital audio signal, and (C) a data width of the digital audio signal.

101. The method of processing a digital audio signal according to claim 100, wherein said adjusting is performed during an inactive portion of the received acoustic signal.

102. The method of processing a digital audio signal according to claim 16, wherein said method is performed by said mobile device, and
wherein during said receiving the acoustic signal, the mobile device is in an idle mode.

103. The method of processing a digital audio signal according to claim 16, wherein said method is performed by said mobile device, and
wherein said mobile device is a mobile phone capable of engaging in voice calls, and
wherein during said receiving the acoustic signal, the mobile device is not engaged in any voice call.

104. The method of processing a digital audio signal according to claim 103, wherein said mobile phone is capable of performing video recording, and
wherein during said receiving the acoustic signal, the mobile device is not performing video recording.

105. The method of processing a digital audio signal according to claim 103, wherein said method comprises periodically sending a signal to at least one base station during said receiving the acoustic signal.

106. The method of processing a digital audio signal according to claim 103, wherein said method comprises periodically receiving a signal from at least one base station during said receiving the acoustic signal.

107. The method of processing a digital audio signal according to claim 16, wherein said method is performed by said mobile device, and
- wherein said mobile device is a mobile phone capable of engaging in voice calls, and
- wherein during said converting the received acoustic signal, the mobile device is not engaged in any voice call.

108. The method of processing a digital audio signal according to claim 16, wherein said method is performed by said mobile device, and
- wherein said mobile device is a mobile phone capable of engaging in voice calls, and
- wherein during said extracting auditory context information, the mobile device is not engaged in any voice call.

109. The apparatus according to claim 19, wherein said audio logging processor is configured to perform said audio logging by initiating an audio logging of the digital audio signal, and
- wherein said apparatus is within said mobile device, and
- wherein said mobile device is a mobile phone capable of engaging in voice calls and capable of performing video recording, and
- wherein said converter is configured to convert said received acoustic signal while the mobile device is neither engaged in any voice call nor performing video recording, and
- wherein said mobile device is configured to periodically send a signal to at least one base station and to periodically receive a signal from at least one base station while said converter is converting said received acoustic signal.

110. The apparatus according to claim 37, wherein said means for performing the audio logging is configured to perform said audio logging by initiating an audio logging of the digital audio signal, and
- wherein said apparatus is within said mobile device, and
- wherein said mobile device is a mobile phone capable of engaging in voice calls and capable of performing video recording, and
- wherein said means for converting is configured to convert said received acoustic signal while the mobile device is neither engaged in any voice call nor performing video recording, and
- wherein said mobile device is configured to periodically send a signal to at least one base station and to periodically receive a signal from at least one base station while said means for converting is converting said received acoustic signal.

111. The medium according to claim 55, wherein said instructions that cause the processor to perform the audio logging cause the processor to perform said audio logging by initiating an audio logging of the digital audio signal, and
- wherein said processor is within said mobile device, and
- wherein said mobile device is a mobile phone capable of engaging in voice calls and capable of performing video recording, and
- wherein said instructions that cause the processor to convert cause the processor to convert said received acoustic signal while the mobile device is neither engaged in any voice call nor performing video recording, and
- wherein said medium includes instructions that cause the processor to cause the mobile device to periodically send a signal to at least one base station and to periodically receive a signal from at least one base station while said instructions that cause the processor to convert are executing.

* * * * *